(12) United States Patent
Pang et al.

(10) Patent No.: US 10,191,669 B2
(45) Date of Patent: *Jan. 29, 2019

(54) REDUNDANT SAS STORAGE VIRTUALIZATION SUBSYSTEM AND SYSTEM USING THE SAME AND METHOD THEREFOR

(71) Applicant: Infortrend Technology, Inc., New Taipei (TW)

(72) Inventors: Ching-Te Pang, New Taipei (TW); Michael Gordon Schnapp, New Taipei (TW); Shiann-Wen Sue, New Taipei (TW); Cheng-Yu Lee, New Taipei (TW)

(73) Assignee: Infortrend Technology, Inc., New Taipei (TW)

( * ) Notice: Subject to any disclaimer, the term of this patent is extended or adjusted under 35 U.S.C. 154(b) by 364 days.

This patent is subject to a terminal disclaimer.

(21) Appl. No.: 15/284,551

(22) Filed: Oct. 4, 2016

(65) Prior Publication Data

US 2017/0024151 A1 Jan. 26, 2017

Related U.S. Application Data

(63) Continuation of application No. 11/246,268, filed on Oct. 11, 2005, now Pat. No. 9,495,263.

(Continued)

(51) Int. Cl.
*G06F 11/20* (2006.01)
*G06F 3/06* (2006.01)

(52) U.S. Cl.
CPC .......... *G06F 3/0617* (2013.01); *G06F 3/0635* (2013.01); *G06F 3/0664* (2013.01);
(Continued)

(58) Field of Classification Search
CPC ............ G06F 11/2092; G06F 11/2094; G06F 11/2005; G06F 11/2089; G06F 3/0635; G06F 3/0658; G06F 3/0689
See application file for complete search history.

(56) References Cited

U.S. PATENT DOCUMENTS

| 7,260,737 | B1 * | 8/2007 | Lent | G06F 11/2092 714/5.11 |
| 7,739,543 | B1 * | 6/2010 | Pittman | G06F 11/006 709/208 |
| 2004/0153844 | A1 * | 8/2004 | Ghose | H04L 41/064 714/42 |

* cited by examiner

*Primary Examiner* — Ernest Unelus
(74) *Attorney, Agent, or Firm* — Winston Hsu

(57) ABSTRACT

A redundant external storage virtualization computer system. The redundant storage virtualization computer system includes a host entity for issuing an IO request, a redundant external SAS storage virtualization controller pair coupled to the host entity for performing an IO operation in response to the IO request issued by the host entity, and a plurality of physical storage devices for providing storage to the computer system. Each of the physical storage devices is coupled to the redundant storage virtualization controller pair through a SAS interconnect. The redundant storage virtualization controller pair includes a first and a second SAS storage virtualization controller both coupled to the host entity. In the redundant SAS storage virtualization controller pair, when the second storage virtualization controller is not on line, the first storage virtualization controller will take over the functionality originally performed by the second storage virtualization controller.

50 Claims, 35 Drawing Sheets

Related U.S. Application Data

(60) Provisional application No. 60/593,212, filed on Dec. 21, 2004.

(52) U.S. Cl.
CPC ........ *G06F 3/0689* (2013.01); *G06F 11/2041* (2013.01); *G06F 11/2089* (2013.01); *G06F 11/2092* (2013.01); *G06F 11/2094* (2013.01)

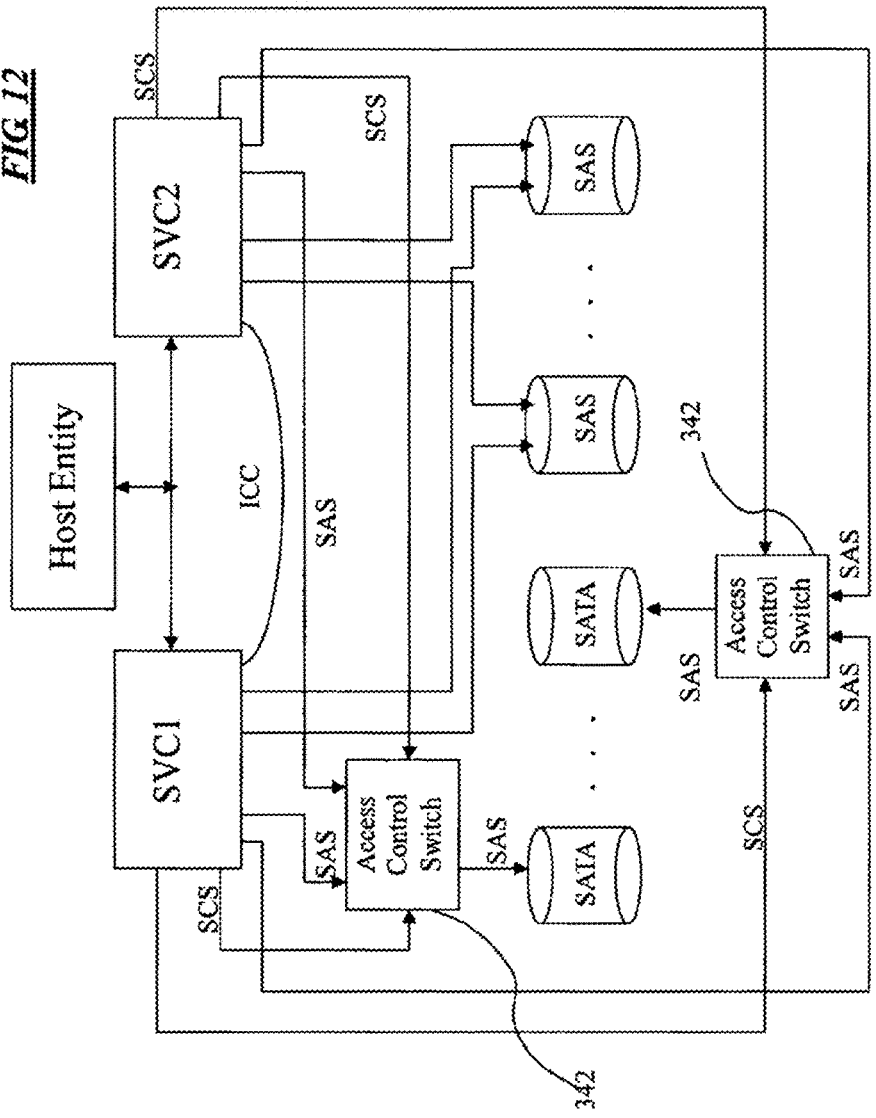

REDUNDANT SAS STORAGE VIRTUALIZATION SUBSYSTEM AND SYSTEM USING THE SAME AND METHOD THEREFOR

CROSS REFERENCE TO RELATED APPLICATIONS

This application is a Continuation application of U.S. patent application Ser. No. 11/246,268, filed on Oct. 11, 2005, which claims the priority benefit of U.S. provisional application Ser. No. 60/593,212, filed on Dec. 21, 2004, the full disclosures of which are incorporated herein by reference.

BACKGROUND OF THE INVENTION

1. Field of the Invention

The present invention pertains to a redundant storage virtualization controller subsystem and computer system using the same, particularly pertaining to redundant storage virtualization controller subsystem having a storage virtualization controller using SAS device-side IO device interconnect for connecting between a host system and a direct access storage device and a computer system using the same.

2. Description of the Prior Art

Storage virtualization is a technology that has been used to virtualize physical storage by combining sections of physical storage devices (PSDs) into logical storage entities, herein referred to as logical media units (LMUs), that are made accessible to a host system. This technology has been used primarily in redundant arrays of independent disks (RAID) storage virtualization, which combines smaller physical storage devices into larger, fault tolerant, higher performance logical media units via RAID technology.

A Storage virtualization Controller, abbreviated SVC, is a device the primary purpose of which is to map combinations of sections of physical storage media to logical media units visible to a host system. IO requests received from the host system are parsed and interpreted and associated operations and data are translated into physical storage device IO requests. This process may be indirect with operations cached, delayed (e.g., write-back), anticipated (read-ahead), grouped, etc., to improve performance and other operational characteristics so that a host IO request may not necessarily result directly in physical storage device IO requests in a one-to-one fashion.

An External (sometimes referred to as "Stand-alone") Storage Virtualization Controller is a Storage Virtualization Controller that connects to the host system via an IO interface and that is capable of supporting connection to devices that reside external to the host system and, in general, operates independently of the host.

One example of an external Storage Virtualization Controller is an external, or stand-alone, direct-access RAID controller. A RAID controller combines sections on one or multiple physical direct access storage devices (DASDs), the combination of which is determined by the nature of a particular RAID level, to form logical media units that are contiguously addressable by a host system to which the logical media unit is made available. A single RAID controller will typically support multiple RAID levels so that different logical media units may consist of sections of DASDs combined in different ways by virtue of the different RAID levels that characterize the different units.

Another example of an external Storage Virtualization Controller is a JBOD emulation controller. A JBOD, short for "Just a Bunch of Drives", is a set of physical DASDs that connect directly to a host system via one or more a multiple-device IO device interconnect channels. DASDs that implement point-to-point IO device interconnects to connect to the host system (e.g., Parallel ATA HDDs, Serial ATA HDDs, etc.) cannot be directly combined to form a "JBOD" system as defined above for they do not allow the connection of multiple devices directly to the IO device channel. An intelligent "JBOD emulation" device can be used to emulate multiple multiple-device IO device interconnect DASDs by mapping IO requests to physical DASDs that connect to the JBOD emulation device individually via the point-to-point IO-device interconnection channels.

Another example of an external Storage Virtualization Controller is a controller for an external tape backup subsystem.

The primary function of a storage virtualization controller, abbreviated as SVC, is to manage, combine, and manipulate physical storage devices in such a way as to present them as a set of logical media units to the host. Each LMU is presented to the host as if it were a directly-connected physical storage device (PSD) of which the LMU is supposed to be the logical equivalent. In order to accomplish this, IO requests sent out by the host to be processed by the SVC that will normally generate certain behavior in an equivalent PSD also generate logically equivalent behavior on the part of the SVC in relation to the addressed logical media unit. The result is that the host "thinks" it is directly connected to and communicating with a PSD when in actuality the host is connected to a SVC that is simply emulating the behavior of the PSD of which the addressed logical media unit is the logical equivalent.

In order to achieve this behavioral emulation, the SVC maps IO requests received from the host to logically equivalent internal operations. Some of these operations can be completed without the need to directly generate any device-side IO requests to device-side PSDs. Among these are operations that are processed internally only, without ever the need to access the device-side PSDs. The operations that are initiated as a result of such IO requests will herein be termed "internally-emulated operations".

There are operations that cannot be performed simply through internal emulation and yet may not directly result in device-side PSD accesses. Examples of such include cached operations, such as data read operations in which valid data corresponding to the media section addressed by the IO request currently happens to reside entirely in the SVC's data cache, or data write operations when the SVC's cache is operating in write-back mode so that data is written into the cache only at first, to be committed to the appropriate PSDs at a future time. Such operations will be referred to as "asynchronous device operations" (meaning that any actual IO requests to device-side PSDs that must transpire in order for the requested operation to achieve its intended goal are indirectly performed either prior or subsequent to the operation rather than directly in response to the operation).

Yet another class of operations consists of those that directly generate device-side IO requests to PSDs in order to complete. Such operations will be referred to as "synchronous device operations".

Some host-side IO requests may map an operation that may consist of multiple sub-operations of different classes, including internally-emulated, asynchronous device and/or synchronous device operations. An example of a host-side IO request that maps to a combination of asynchronous and synchronous device operations is a data read request that addresses a section of media in the logical media unit part of whose corresponding data currently resides in cache and part of whose data does not reside in cache and therefore must be read from the PSDs. The sub-operation that takes data from the cache is an asynchronous one because the sub-operation does not directly require device-side PSD accesses to complete, however, does indirectly rely on results of previously-executed device-side PSD accesses. The sub-operation that reads data from the PSDs is a synchronous one, for it requires direct and immediate device-side PSD accesses in order to complete.

A pair of SVCs can be configured into a pair of redundant SVCs, of which the primary motivation is to allow continued, uninterrupted access to data by a host (or more than one host) even in the event of a malfunction or failure of a single SVC. This is accomplished by incorporating functionality into the SVCs that allow one controller to take over for the other in the event that the other becomes handicapped or completely incapacitated. A storage virtualization subsystem has such configuration hereinafter is referred to a redundant storage virtualization subsystem.

On the device side, this requires that both controllers are able to access all of the physical storage devices (PSDs) that are being managed by the SVCs, no matter which SVC any given PSD may initially be assigned to be managed by. On the host side, this requires that each SVC have the ability to present and make available to the host all accessible resources, including those that were originally assigned to be managed by the alternate SVC, in the event that its mate does not initially come on line or goes off line at some point (e.g., due to a malfunction/failure, maintenance operation, etc.).

A typical device-side implementation of this would be one in which device-side IO device interconnects are of the multiple-initiator, multiple-device kind (such as Fibre, Parallel SCSI), and all device-side IO device interconnects are connected to both SVCs such that either SVC can access any PSD connected on a device-side IO device interconnect. When both SVCs are on-line and operational, each PSD would be managed by one or the other SVC, typically determined by user setting or configuration. As an example, all member PSDs of a logical media unit (LMU) that consists of a RAID combination of PSDs would be managed by the particular SVC to which the logical media unit itself is assigned.

A typical host-side implementation would consist of multiple-device IO device interconnects to which the host (s) and both SVCs are connected and, for each interconnect, each SVC would present its own unique set of device IDs, to which LMUs are mapped. If a particular SVC does not come on line or goes off line, the on-line SVC presents both sets of device IDs on the host-side interconnect, its own set together with the set normally assigned to its mate, and maps LMUs to these IDs in the identical way they are mapped when both SVCs are on-line and fully operational. In this kind of implementation, no special functionality on the part of the host that switches over from one device/path to another is required to maintain access to all logical media units in the event that an SVC is not on-line. This kind of implementation is commonly referred to as "transparent" redundancy.

Redundant SVC configurations are typically divided into two categories. The first is "active-standby" in which one SVC is presenting, managing, and processing all IO requests for all logical media units in the storage virtualization subsystem (abbreviated SVS) while the other SVC simply stands by ready to take over in the event that the active SVC becomes handicapped or incapacitated. The second is "active-active" in which both SVCs are presenting, managing, and processing IO requests for the various LMUs that are present in the SVS concurrently. In active-active configurations, both SVCs are always ready to take over for the other in the event that one malfunctions, causing it to become handicapped or incapacitated. Active-active configurations typically provide better levels of performance because the resources of both SVCs (e.g., CPU time, internal bus bandwidth, etc.) can be brought to bear in servicing IO requests rather than the resources of only one SVC.

Another essential element of a redundant storage virtualization system is the ability for each SVC to monitor the status of the other. Typically, this would be accomplished by implementing an inter-controller communications channel (abbreviated ICC) between the two SVCs over which they can exchange the operating status. This communications channel may be dedicated, the sole function of which is to exchange parameters and data relating to the operation of the redundant storage virtualization subsystem, or it can be one or more of the IO device interconnects, host-side or device-side, over which operational parameters and data exchange are multiplexed together with host-SVC or device-SVC IO-request-associated data on these interconnects.

Yet another important element of a redundant storage virtualization system is the ability of one SVC to completely incapacitate the other so that it can completely take over for the other SVC without interference. For example, for the surviving SVC to take on the identity of its mate, it may need to take on the device IDs that the SVC going off line originally presented on the host-side IO device interconnect, which, in turn, requires that the SVC going off line relinquish its control over those IDs.

This "incapacitation" is typically accomplished by the assertion of reset signal lines on the controller being taken off line bringing all externally connected signal lines to a pre-defined state that eliminates the possibility of interference with the surviving SVC. Interconnecting reset lines between the SVCs so that one can reset the other in this event is one common way of achieving this. Another way to accomplish this is to build in the ability of an SVC to detect when itself may be malfunctioning and "kill" itself by asserting its own reset signals (e.g., inclusion of a "watchdog" timer that will assert a reset signal should the program running on the SVC fail to poll it within a predefined interval), bringing all externally connected signal lines to a pre-defined state that eliminates the possibility of interference with the surviving SVC.

Please refer to FIG. 22, where a block diagram of a conventional redundant external storage virtualization computer system is illustrated. Note the interconnection of the host-side IO device interconnects that allows an SVC to take over for its mate by taking over the IO device interconnect IDs that would normally be presented onto the interconnect by its mate and mapping logical media units to these IDs in the same way its mate would. Also, note the interconnection of the device-side IO device interconnects that allow both SVCs access to all PSDs connected to the device-side IO device interconnects. In this example, a typical IO device interconnect that might be used on either host side or device side might be parallel SCSI or Fibre FC-AL, both multiple-initiator, multiple-device IO device interconnects. Therefore, both SVCs operating in target mode (i.e., device mode) are connected to a single interconnect on the host side and allow both SVCs operating in initiator mode, together with multiple devices, to be interconnected on the device side. The configuration shown in FIG. 22 suffers from the drawback that a malfunction of a single PSD, depending on the nature of the malfunction, can potentially bring down an entire device-side IO device interconnect making all other PSDs connected on the same interconnect inaccessible.

FIG. 23 diagrams an improvement on this that effectively avoids the possibility that access to other PSDs connected on the same device-side IO device interconnect might be disrupted due to a malfunction that causes a single device-side interconnect to fail by making use of dual-ported PSDs and adding an additional interconnect to each PSD. In this way, the blockage of a single device-side IO device interconnect, possibly caused by a malfunction of an interconnect controller IC on the PSD, would not result in the inaccessibility of other PSDs connected on the same interconnect because the second interconnect connected to each of the same PSDs can be used to access those PSDs without interference.

The configuration shown in FIG. 23 has the further advantage that IO request load can be distributed between the redundant device-side interconnects thereby effectively doubling the overall bandwidth of the device-side IO device interconnect subsystem as compared to the single-interconnect-per-PSD-set configuration shown in FIG. 22. In this case, the typical device-side IO device interconnect of choice would typically be Fibre FC-AL because of the dual-ported nature of Fibre FC-AL PSDs currently on the market and the elements of the Fibre protocol that allow an initiator, such as an SVC, to determine which interconnect IDs on different interconnects correspond to the same PSD.

While the configuration depicted in FIG. 23 is, indeed, far more robust than that depicted in FIG. 22 in the face of device-side IO device interconnect failure, there is still the possibility that a PSD might malfunction in such a way that it could bring down both IO device interconnects that are connected to its dual-ported port pair. Were this to happen, once again, access to other PSDs connected on the same interconnect pair would be disrupted. In a logical media unit that consists of a standard singly-redundant RAID combination of PSDs (e.g., RAID 5), this could prove disastrous for it can cause multiple PSDs in the combination to go off line causing the entire LMU to go off line.

In the co-pending U.S. patent application Ser. No. 10/707,871, entitled "STORAGE VIRTUALIZATION COMPUTER SYSTEM AND EXTERNAL CONTROLLER THEREFOR," Ser. No. 10/708,242, entitled "REDUNDANT EXTERNAL STORAGE VIRTUALIZATION COMPUTER SYSTEM," and Ser. No. 10/709,718, entitled "JBOD SUBSYSTEM AND EXTERNAL EMULATION CONTROLLER THEREOF," a computer system comprising a SVS implementing SATA interconnects were disclosed in which when using a SATA SVC, a SATA DASD is considered to be the primary DASD.

Therefore, there is a need for a redundant SVS using SAS storage virtualization controller having device-side IO device interconnect port complying with SAS protocol for connecting with DASDs such as SAS DASDs as the primary DASDs thereof. Moreover, there is a need for a SVS that can use a second type of DASD, such as SATA DASD, as a primary DASD rather than the SAS DASDs in addition to the capability of using SAS DASDs as the primary DASDs.

SUMMARY OF THE INVENTION

It is therefore a primary object of the present invention is to provide SAS Storage Virtualization Controller and Subsystem which provide storage virtualization to hosts connected via standard host-storage interfaces such as Fibre/SCSI/iSCSI/SAS using a pair of External SAS Storage Virtualization controllers configured redundantly so that a controller will takeover all the operations originally performed by the alternate controller should it malfunction. The physical storage devices could be native SAS devices, native S-ATA devices, or P-ATA devices that connect to the device-side S-ATA IO device interconnect through a Parallel-to-Serial-ATA conversion circuit.

According to the claimed invention, a computer system is provided. The computer system comprises a host entity for issuing IO requests; a redundant external storage virtualization controller (SVC) pair for performing IO operations in response to IO requests issued by the host entity comprising a first and a second external SVC coupled to the host entity; and a set of at least one physical storage device (PSD) for providing data storage space to the computer system, with at least one member of said set of at least one PSD comprising a PSD coupled to the said redundant SVC pair through a point-to-point serial signal interconnect for transmission with SAS protocol; wherein when one SVC in the said redundant SVC pair is not on line or goes off line after being on line, the alternate SVC in the said redundant SVC pair will automatically take over the functionality originally performed by the said one SVC in the redundant SVC pair.

According to the claimed invention, a redundant storage virtualization subsystem for providing data storage space is provided. The redundant storage virtualization subsystem comprises a redundant external storage virtualization controller (SVC) pair for performing IO operations in response to IO requests issued by a host entity comprising a first and a second SVC for coupling to the host entity; and a set of at least one physical storage device (PSD) for providing data storage space to the host entity, with at least one member of said set of at least one PSD comprising a PSD coupled to the said redundant SVC pair through a point-to-point serial signal interconnect for transmission with SAS protocol; wherein when one SVC in the said redundant SVC pair is not on line or goes off line after being online, the alternate SVC in the said redundant SVC pair will automatically take over the functionality originally performed by the said one SVC in the redundant SVC pair.

According to the claimed invention, a storage virtualization controller for using in a redundant storage virtualization subsystem for providing data storage space is provided. The storage virtualization controller comprises a central processing circuitry for performing IO operations in response to IO requests of a host entity; at least one IO device interconnect controller coupled to said central processing circuitry; at least one host-side IO device interconnect port provided in a said at least one IO device interconnect controller for coupling to said host entity; and at least one SAS device-side SAS IO device interconnect port provided in a said at least one IO device interconnect controller for performing point-to-point serial signal transmission with SAS protocol with at least one PSDs; wherein the said external SVC will automatically take over the functionality originally performed by the alternate external SVC in the said redundant SVC pair when said alternate external SVC is not on line or goes off line after being on line.

According to the claimed invention, a method for performing storage virtualization in a computer system is provided. The computer system comprises a first and a second external storage virtualization controller (SVC) configured into a redundant SVC pair. The method comprises in response to IO requests issued by an host entity of the computer system, performing IO operations by one SVC in said redundant SVC pair to at least one of physical storage device (PSD) of the computer system using point-to-point serial signal transmission with SAS protocol; when the said one SVC in said redundant SVC pair is not on line or goes off line after being on line, performing the said IO operations by the alternate SVC in said redundant SVC pair in response to said IO requests issued by said host entity to access said at least one PSD of the computer system.

It is an advantage of the claimed invention that in the redundant external storage virtualization computer system using SAS as the primary device-side IO device, each physical storage device has a dedicated interconnect to the storage virtualization controller pair.

It is another advantage of the claimed invention that not only the payload data portion of information but also the control information are protected by the SAS device interconnect.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 12 is a block diagram of a redundant external storage virtualization computer system according to the present invention;

DETAILED DESCRIPTION

FIGS. 1 through 11B exemplifying the main architecture of the present invention. Further details of the operation flows and certain detail structure of the present invention will be explained further according to FIGS. 12 through 21.

Figure 1:
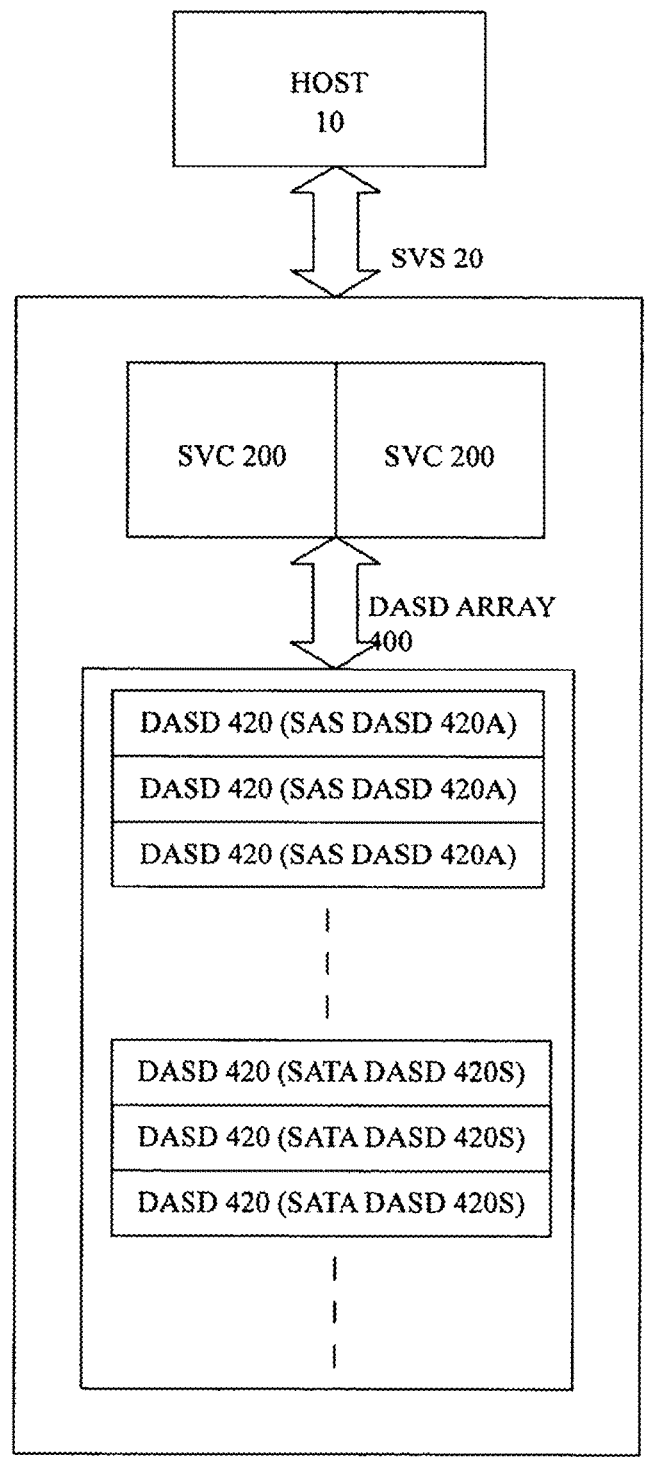
FIG. 1 is a block diagram showing a main structure of an embodiment of a system according to the present invention.

FIG. 1 is a block diagram showing a main structure of an embodiment of a system comprising a SVS (Storage Virtualization Subsystem) and SVCs (Storage Virtualization Controllers) according to the present invention. The system according to the present invention comprises a host computer 10 and a SVS 20 connecting thereto. Although there is illustrated in FIG. 1 only one host 10 connected with one SVS 20, there can be more than one SVS 20 attached to the host 10; or, more than one host 10 can be attached to the SVS 20. Or more than one host 10 can be attached to more than one SVS 20.

The host 10 can be a server system, a work station, or a PC system, or the like. Alternatively, the host 10 can be another SVC. The SVS 20 comprises a pair of SVCs 200, each of which can be a RAID controller or a JBOD emulator, and a DASD (direct access storage device) array 400. Although only one DASD array 400 is illustrated here, more than one DASD array 400 can be attached to the SVC 200.

The SVC 200 is a SAS SVC, i.e., a SVC implemented complying with the SAS protocol. The SVC 200 receives the IO requests and related data (the control signals and data signals) from the host 10 and executes the IO requests internally or map them to the DASD array 400. The SVC 200 can be used to enhance performance and/or to improve data availability and/or to increase storage capacity of a single logical media unit (e.g. a logical disk) in view of the host 10. The DASD array 400 comprises a plurality of DASDs 420, such as hard disk drive (HDD), which comprises either SAS DASDs 420A or SATA DASDs 420s or both.

When a logical media unit in the SVS 20 is set to use a RAID level other than level 0 or 1, for example, levels 3 through 6, the DASDs 420 contains at least one parity DASD, that is, a DASD which contains parity data therein, and data availability can thus be improved. In addition, the performance can be improved in execution of an IO operation, since the accessed data is distributed among more than one DASD. Moreover, since the logical media unit is a combination of sections of a plurality of DASDs, the accessible storage capacity in a single logical media unit can be largely increased. For example, in a RAID subsystem of RAID level 5, the functionality described above can all be achieved. In a RAID subsystem of RAID level 6, it is similar to RAID 5, but it contains parity data that can protect against data loss due to two failed DASDs and increases the data availability of the storage system.

When a logical media unit in the SVS 20 is set to use a RAID level 1, the same data will be stored in two separate DASDs, and thus data availability can be greatly enhanced at the cost of doubling the DASD cost.

When a logical media unit in the SVS 20 is set to use a RAID level 0, performance improvement rather than the availability concern is the main issue and thus no enhancement of data availability is provided. Performance, however, can be greatly improved. For example, a RAID subsystem of RAID level 0 having 2 hard disk drives can have, theoretically, a performance of 200% of a storage device having only one hard disk drive, since different data sections can be stored into the two separate hard disk drives at the same time under the control of the SVC 200.

Figure 2A:
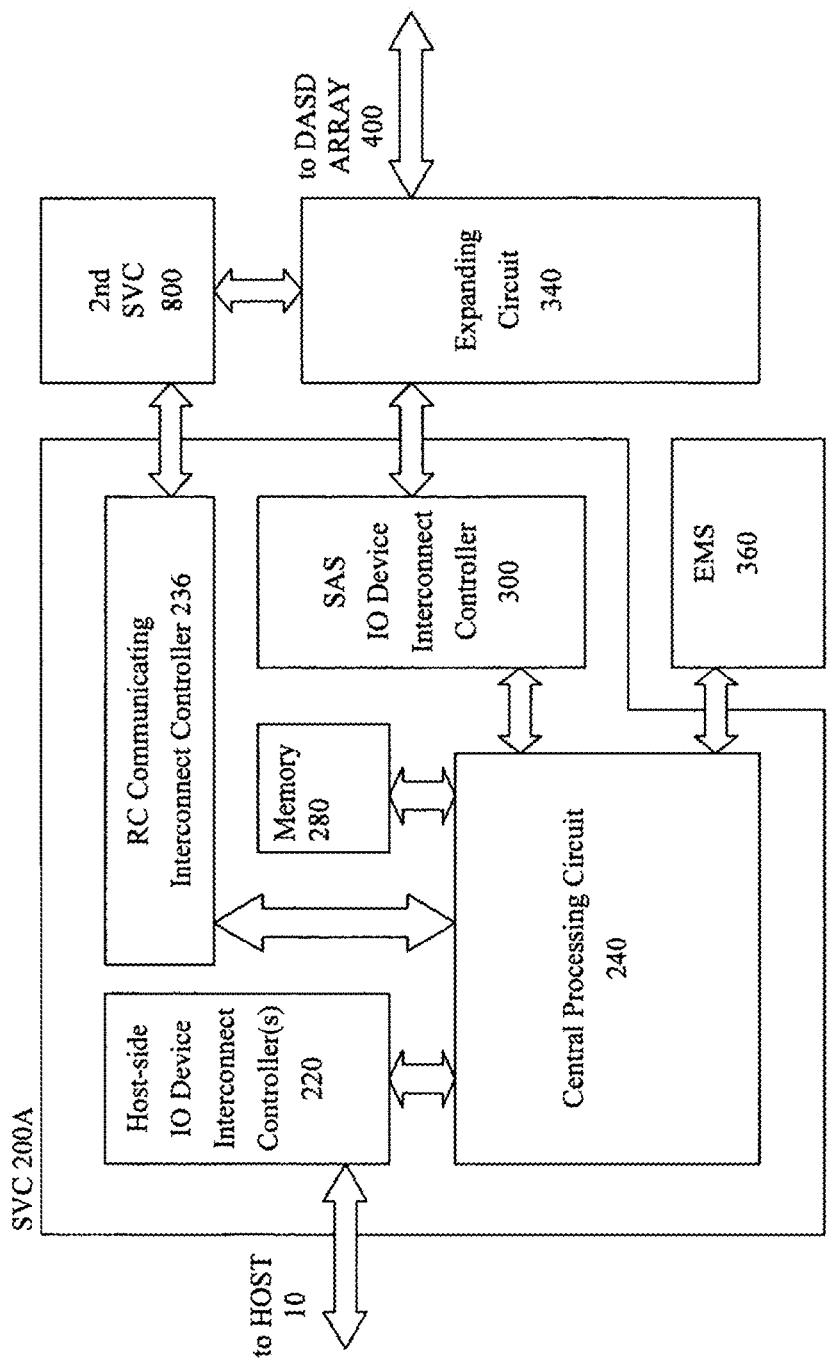
FIG. 2A is a block diagram showing a first embodiment of an SVC 200 according to the present invention and the connection thereof to the host and the DASD array.

FIG. 2A is a block diagram showing a first embodiment of an SVC 200 according to the present invention and the connection thereof to the host and the DASD array. In this embodiment, the SVC 200A comprises a host-side IO device interconnect controller 220, a CPC (central processing circuitry) 240, a memory 280, and a SAS (Serial Attached SCSI) IO device interconnect controller (or the device-side IO device interconnect controller) 300, and a redundant controller communicating (RCC) interconnect controller 236. Although illustrated in separate functional blocks, two or more or even all of these functional blocks can be incorporated into one chip in practical implementation.

The host-side IO device interconnect controller 220 is connected to the host 10 and the CPC 240. The host-side IO device interconnect controller 220 is an interface and buffer between the SVC 200A and the host 10, and receives IO requests and related data from the host and map and/or transfer them to the CPC 240.

When the CPC 240 receives the IO requests of the host 10 from the host-side IO device interconnect controller 220, CPC 240 parses it and performs some operations in response to the IO requests and sends the data requested and/or reports and/or information of the SVC 200A back to the host 10 through the host-side IO device interconnect controller 220.

After parsing a request received from the host 10, while a read request is received and one or more operations are performed in response, the CPC 240 gets the requested data either internally or from the memory 280 or in both ways and transfers them to the host 10. If the data is not available either internally or does not exists in the memory 280, IO request will be issued to the DASD array 400 through the SAS IO device interconnect controller 300 and the requested data will be transferred from the DASD array 400 to memory 280 and then passed to the host 10 through host-side IO device interconnect controller 220.

When a write request is received from the host 10, after parsing the request and performing one or more operations, the CPC 240 gets the data from the host 10 through host-side IO device interconnect controller 220, stores them to the memory 280 and then move them out to the DASD array 400 through the CPC 240. When the write request is a write back request, the IO complete report can be issued to the host first and then the CPC 240 performs the actual write operation later. Otherwise, when the write request is a write through request, an IO complete report is issued to the host 10 after the requested data is actually written into the DASD array 400.

The memory 280 is connected to the CPC 240 and acts as a buffer therefor to buffer the data transferred between the host 10 and the DASD array 400 passing the CPC 240. In one embodiment, the memory 280 can be a DRAM; more particularly, the DRAM can be a SDRAM.

The SAS IO device interconnect controller 300 is the device-side IO device interconnect controller connected to the CPC 240 and the DASD array 400. The SAS IO device interconnect controller 300 is an interface and buffer between the SVC 200A and the DASD array 400, and receives IO requests and related data issued from CPC 240 and map and/or transfer them to the DASD array 400. The SAS IO device interconnect controller 300 re-formats the data and control signals received from CPC 240 to comply with SAS protocol and transmits them to the DASD array 400.

When the DASD 420 in the DASD array 400 receives the IO requests of the CPC 240 through the SAS IO device interconnect controller 300, it performs some operations in response to the IO requests and transfers the requested data and/or reports and/or information to and/or from the CPC 240. More than one type of DASDs 420 can be provided in the DASD array 400. For example, the DASD array 400 comprises both SAS DASDs 420A and SATA DASDs 420S.

The RCC interconnect controller 236 is implemented in SVC 200A to connect the CPC 240 to a second SVC 800. In addition, the SAS IO device interconnect controller 300 is connected to the DASD array 400 through the expanding circuit 340. The expanding circuit 340 is also connected to the second SVC 800. In this arrangement, a redundant second SVC 800 can be attached to the SVC 200B. The DASD array 400 can be accessed by the two SVCs 200A and 800, through the expanding circuit 340. Moreover, the control/data information from the host 10 can be transferred from the CPC 240 through the RCC interconnect controller 236 to the SVC 800, and further to a second DASD array (not shown) if required. Since there are more than one SVC, an SATA multiplexing circuit 460 is provided between the SVCs and the SATA DASD 420S as a port selector when more than one SVC are connected to the SATA DASD 420S. This will occur when, for example, the SVCs 200A and 800 are configured into a redundant SVC pair in a SVS including the SATA DASD 420S.

An enclosure management service circuitry (EMS) 360 can be attached to the CPC 240 for management circuitry on an enclosure for containing the DASD array 400. In another arrangement of the SVS, the enclosure management service circuitry (EMS) 360 can be omitted, depending on the actual requirements of the various product functionality.

Figure 2B:
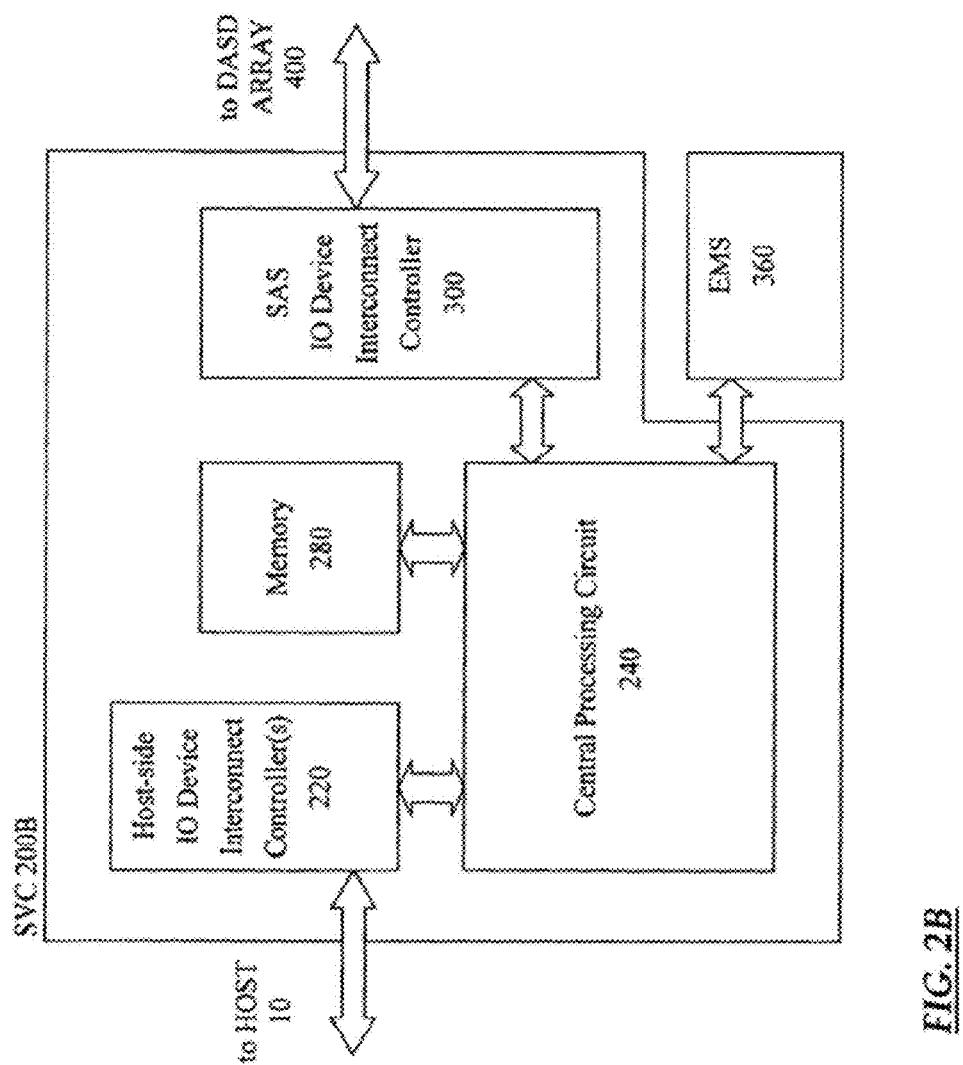
FIG. 2B is a block diagram showing a second embodiment of an SVC 200 according to the present invention and the connection thereof to the host and the DASD array.

FIG. 2B is a block diagram showing a second embodiment of an SVC 200 according to the present invention and the connecting arrangement thereof to the host and the DASD array 400 through an expanding circuit 340 provided outside the SVC 200. In this embodiment, the SVC 200B comprises a host-side IO device interconnect controller 220, a CPC 240, a memory 280, a SAS IO device interconnect controller 300. Although illustrated in separate functional blocks, some or all of these functional blocks can be incorporated into to one chip.

Comparing with SVC 200A, in this embodiment, the RCC interconnect controller 236 is omitted in SVC 200B. Therefore, the SVC 200B has to utilize other IO device interconnect controller to function as the RCC interconnect controller to communicate with another SVC (not shown).

Figure 10:
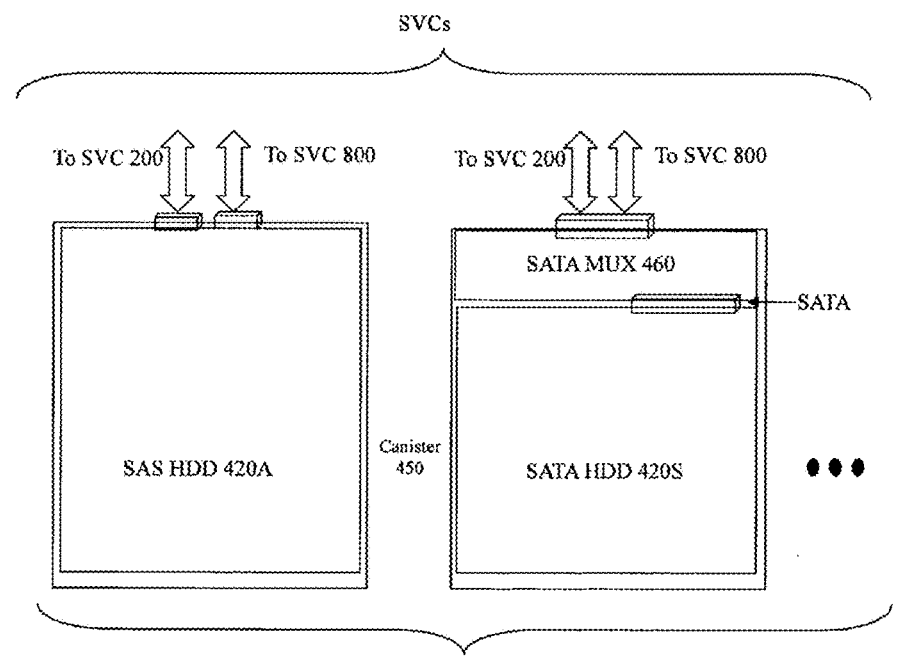
FIG. 10 exemplifies connection structure between the SVC and the DASD array.

FIG. 10 exemplifies a connecting arrangement of DASDs to the SVCs 200 and 800, in which more than one type of DASDs, such as SATA HDD 420S and SAS HDD 420A, are provided in the DASD array 400. In the present example, the DASD 420 comprises a SAS hard disk drive (HDD) 420A and a SATA hard disk drive 420S. Due to the compatibility of the SAS protocol to a SATA HDD, the single port SATA HDD 420S can be connected to the SVCs via a SATA MUX 460. The DASD 420 could be contained in a removable canister 450. The removable canister allows the DASD 420 and any related circuitry to be easily swapped out in the event of that a DASD 420 and/or related circuitry needs servicing. By placing the conversion circuit in the canister the entire canister contents of the DASD, for example, SATA DASD, could be swapped out with another kind of DASD, for example, a PATA DASD related circuitry.

Figure 11B:
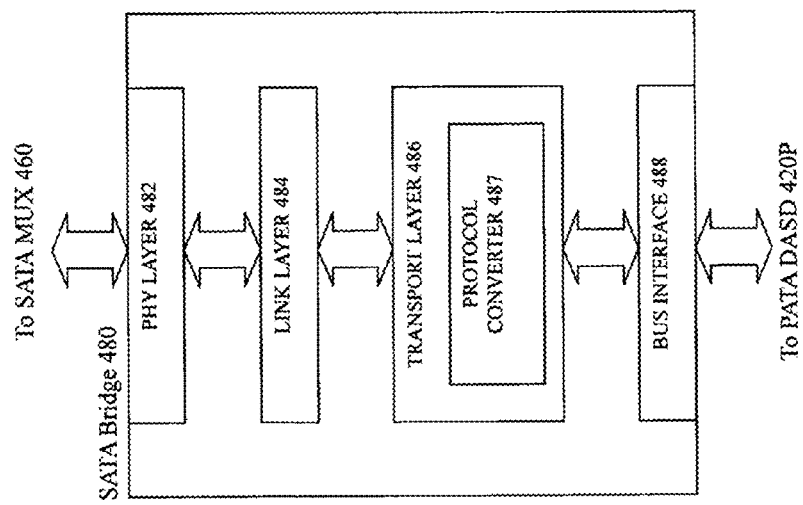
FIG. 11A-11B disclose the details of the multiplexer and bridge between SVC and DASD array shown in FIG. 10.
Figure 11A:
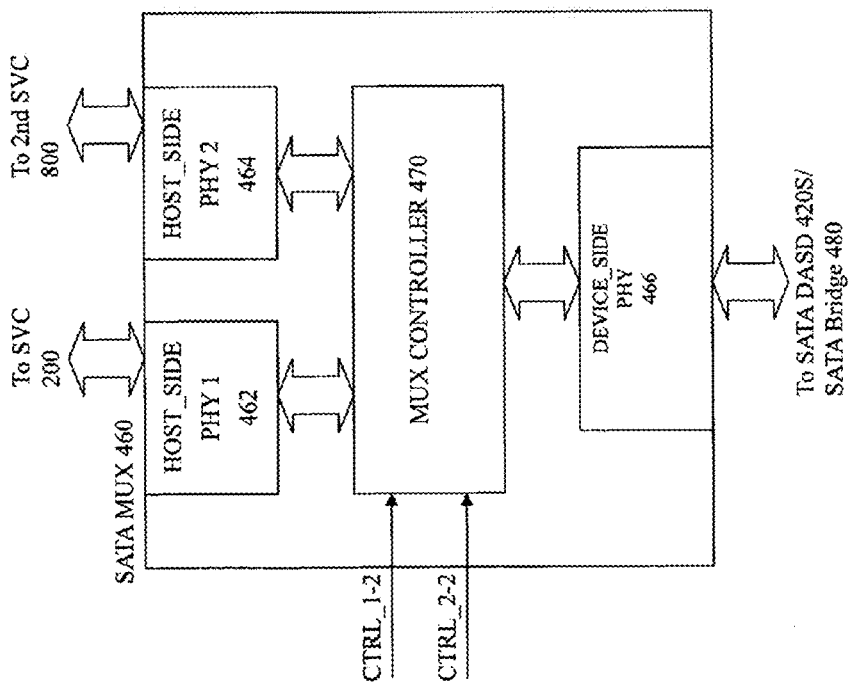

FIG. 11A discloses an example of the SATA multiplexing circuit 460. The data in the SATA format from the SVC 200 is received by the host-side PHY1 462 and the data in the SATA format from the second SVC 800 is received by the host-side PHY2 464. The Mux controller 470 determines which of the SVCs 200 and 800 has the access to the DASD 420S through the device-side PHY 466 under the control of control signals CTRL_1-2 and CTRL_2-2 from the SVCs 200 and 800, respectively. According to SATA2 protocol, however, the control signals CTRL_1-2 and CTRL_2-2 can be omitted. In a further embodiment, the DASD 420P can be a PATA HDD 420P, and there is a bridge 480 provided between the SATA multiplexing circuit 460 and the PATA HDD 420P to convert the SATA signals into PATA signals which can be received and handled by the PATA HDD controller. FIG. 11B disclose an example of the bridge 480.

The data signals from SATA mux 460 is received by the PHY layer 482, and are transferred to transport layer 486 through link layer 484. The signals in SATA format are than converted by the protocol converter 487 to comply with the format of Parallel ATA and then transferred to the PATA SASD 420P through the bus interface 488.

The RCC interconnect controller 236 can be integrated with the host-side IO device interconnect controller 220 as a single-chip IC, which comprises a plurality of IO ports including one or more host-side ports and one or more device-side ports. Alternatively, the RCC interconnect controller 236 can be integrated with the device-side IO device interconnect controller 300 as a single-chip IC. Furthermore, the host-side IO device interconnect controller 220, the device-side IO device interconnect controller 300, and the RCC interconnect controller 236 can all be integrated as a single-chip IC. In such an implementation, the single-chip IO device interconnect controller may comprise IO ports for using as host-side port (s), device-side port (s), and IO ports for connecting between the SVCs 200 and 800.

Figure 2C:
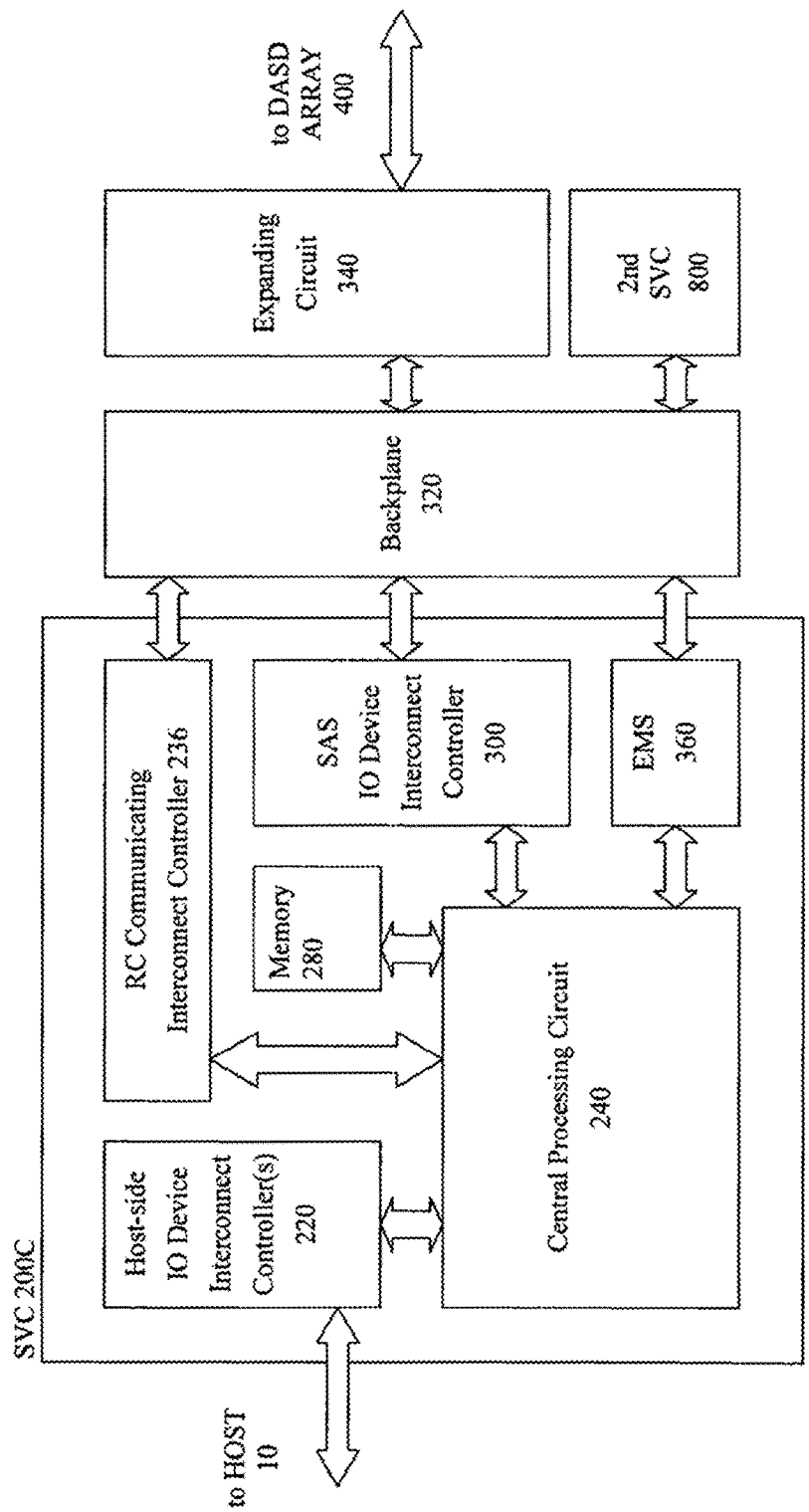
FIG. 2C is a block diagram showing a third embodiment of an SVC 200 according to the present invention and the connection thereof to the host and the DASD array.
Figure 3A:
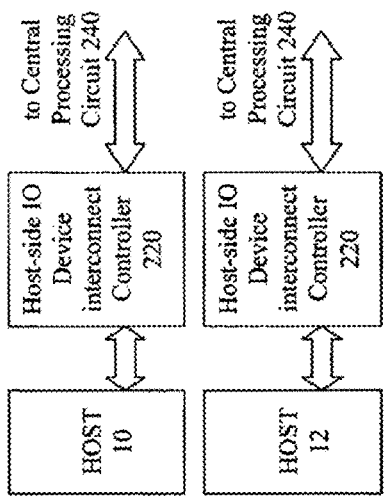
FIGS. 3A through 3D show various block diagrams exemplifying the connecting arrangement between the host(s)/a redundant SVC, the host-side IO device interconnect controller, and the CPC according to the present invention.
Figure 3C:
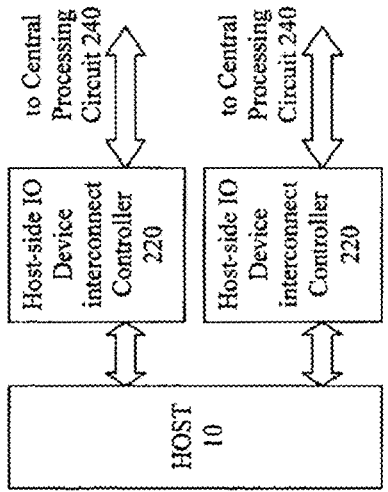
Figure 3B:
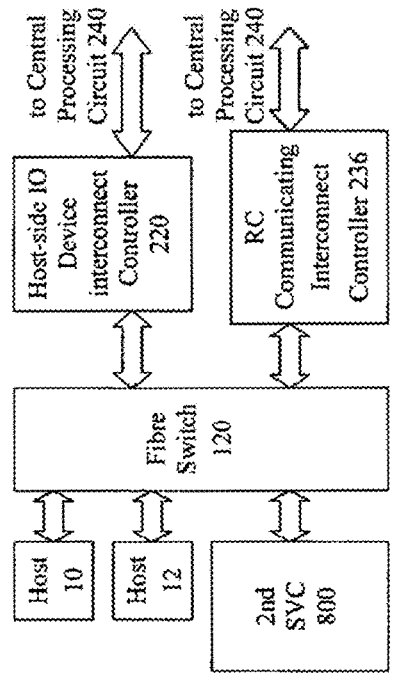
Figure 3D:
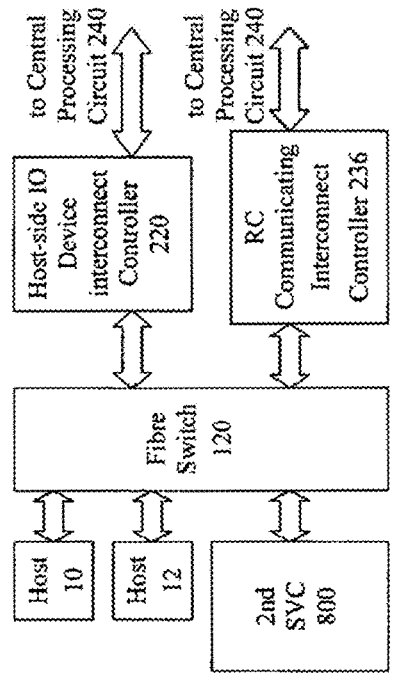

FIG. 2C is a block diagram showing a third embodiment of an SVC 200 according to the present invention and the connection thereof to the host and the DASD array through a backplane 320 and an expanding circuit 340. In this embodiment, the SVC 200B comprises a host-side IO device interconnect controller 220, a CPC 240, a memory 280, a SAS (Serial Attached SCSI) IO device interconnect controller 300, an EMS 360 and a redundant controller communicating (RCC) interconnect controller 236. Although illustrated in separate functional blocks, some or all of these functional blocks can be incorporated into to one chip.

Comparing with SVC 200A, in the SVC 200C, the SAS IO device interconnect controller 300 is connected through the backplane 320 to the switching circuit 340, and then to the DASD array 400. The backplane 320 is a circuit board, e.g., a printed circuit board, having connecting wiring provided therein for connecting between the SVC 200C and the expanding circuit 340 to make the connecting more robust and facilitate the attaching and removing of the SVCs and/or the DASD. In the arrangement shown in FIG. 2A, the physical electrical connection between the SAS IO device interconnect controller 300 and the expanding circuit 340 is, for example, a cable, which is not so robust as the backplane circuit board 320. In addition, the EMS circuit 360 is provided in the SVC 200 rather than outside the SVC 200.

In this arrangement, the physical electrical connection between the RCC interconnect controller 236 and the second SVC 800 is provided in the backplane 320.

In the embodiments of FIG. 2A-2C, the host-side IO device interconnect controller 220 and the device-side IO device interconnect controller 300 (SAS IO device interconnect controller 300) could be implemented with the same kind of IC chip, with IO device interconnect ports in the host-side IO device interconnect controller 220 configured as host-side IO device interconnect ports and with IO device interconnect ports in the device-side IO device interconnect controller 300 configured as device-side IO device interconnect ports. Alternately, a single chip could be configured to contain both host-side IO device interconnect ports and device-side IO device interconnect ports for, respectively, coupling to the host entity 10 and the PSD array 400 concurrently. Furthermore, a single chip could be configured to contain all the host-side IO device interconnect ports for coupling to the host entity 10, the device-side IO device interconnect ports for coupling to the PSD array 400, and ports for coupling to SVC 800, respectively but concurrently.

Alternatively, the EMS circuit 360 can be incorporated into CPC 240. Moreover, the EMS 360 can be implemented in the SAS IO device interconnect controller 300 as well.

FIGS. 3A through 3D show various block diagrams exemplifying the connecting arrangement between the host(s) and redundant SVC, the host-side IO device interconnect controller 220, and the CPC according to the present invention. In a first embodiment shown in FIG. 3A, a host 10 is connected through separate ports with two host-side IO device interconnect controllers 220, both connecting to the same CPC 240. In a second embodiment shown in FIG. 3B, two separate hosts 10 and 12 are each connected to a separate host-side IO device interconnect controllers 220, both connecting to the same CPC 240. In a third embodiment shown in FIG. 3C, a host 10 is connected to a host-side IO device interconnect controllers 220 and then to the CPC 240, while a second SVC 800 is connected to a RCC interconnect controller 236 and then to the same CPC 240. In a fourth embodiment shown in FIG. 3D, a fibre-to-SAS SVS architecture is disclosed. Two separate hosts 10 and 12 and a SVC 800 are each connected to a fibre switch 120, and a host-side IO device interconnect controller 220 and a RCC interconnect controller 236 are connected to the fibre switch 120. The host-side IO device interconnect controller 220 and the RCC interconnect controller 236 are connected to the same CPC 240. The switch can be implemented with a multiplexer. When the host-side IO device interconnect controller 220 is implemented to have a SAS port therein for connecting with the host port of the host entity, it is similar to the SAS port provided in the device-side IO device interconnect controller 300, but configured in target mode rather than in initiator mode.

Figure 4:
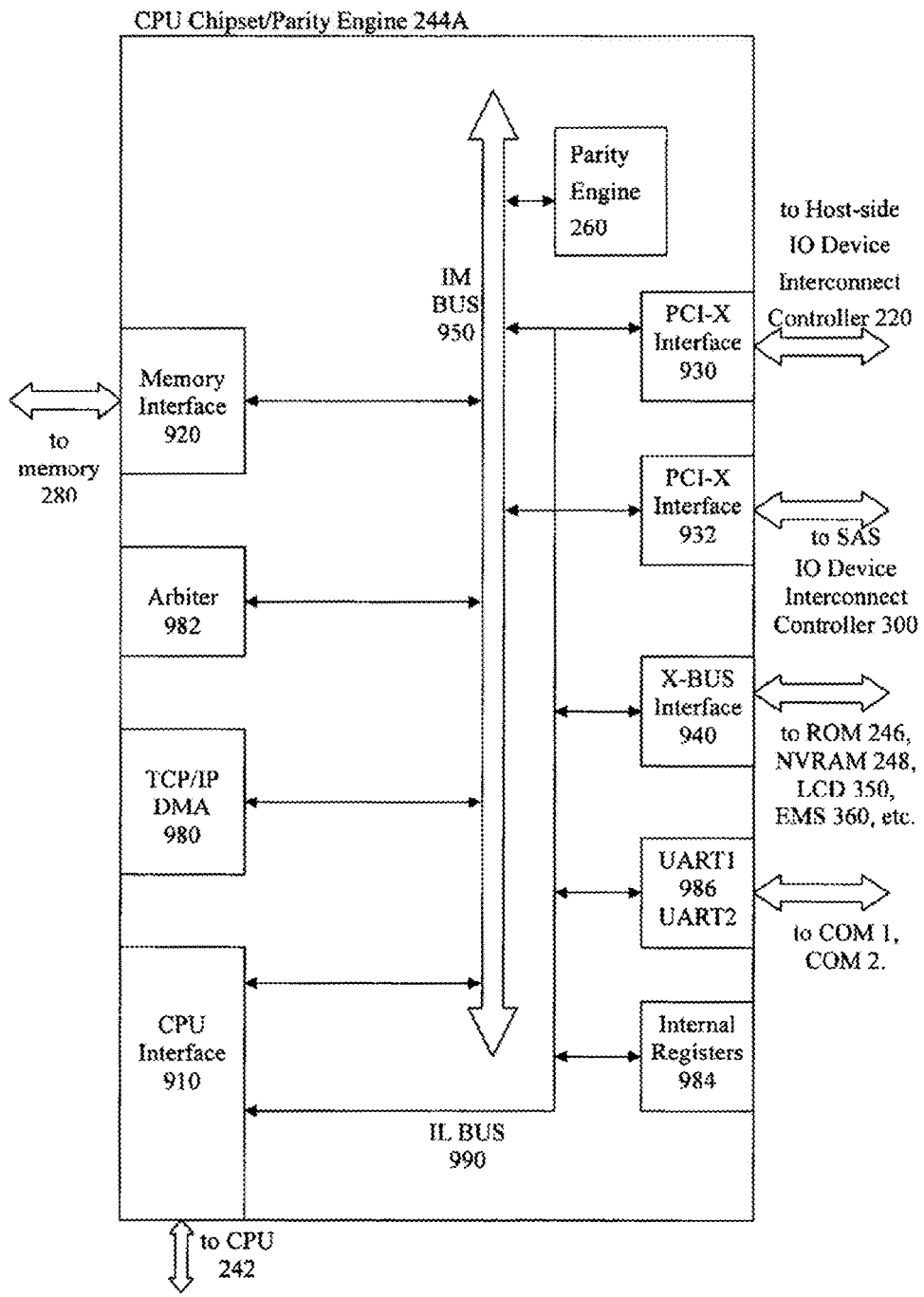
FIG. 4 is a block diagram illustrating an embodiment of the CPU chipset/parity engine according to the present invention.

FIG. 4 is a block diagram illustrating an embodiment of the CPU chipset/parity engine 244 according to the present invention. In the present embodiment, the CPU chipset/parity engine 244A mainly comprises parity engine 260, CPU interface 910, memory controller 920, PCI-X interfaces 930, 932, X-BUS interface 940, TCP/IP DMA 980, Arbiter 982, IM BUS (Internal Main BUS) 950, and IL Bus (Internal Local Bus) 990. The IM BUS 950 is, for example, a 128-bit, 133 Mhz bus and connects the parity engine 260, CPU interface 910, memory controller 920, PCI-X interfaces 930, 932, X-BUS interface 940 altogether for communicating data signal and control signal among them.

Data and control signals from host-side IO device interconnect controller 220 enter CPU chip/parity engine 244A through PCI-X interface 930. The PCI-X interface 930 to the host-side IO device interconnect controller 220 can be, for example, of a bandwidth of 64-bit, 133 Mhz. When the PCI-X interface 930 owns the IM bus 950, the data and control signals are then transmitted to either the memory controller 920 or to the CPU interface 910.

The data and control signals received by the CPU interface 910 from IM bus 950 are transmitted to CPU 242 for further treatment. The communication between the CPU interface 910 and the CPU 242 can be performed, for example, through a 64 bit data line and a 32 bit address line. The data and control signals can be transmitted to the memory controller 920 of a bandwidth of 64 bit, 133 MHz.

An ECC (Error Correction Code) circuit is also provided in the memory controller 920 to generate ECC code. The ECC code can be generated, for example, by XORing 8 bits of data for a bit of ECC code. The memory controller 920 then stores the data and ECC code to the memory 280, for example, an SDRAM. The data in the memory 280 is transmitted to IM bus 950. The memory controller 920 has the functionality of one-bit auto-correcting and multi-bit error detecting and such functionality is performed on the data when the data is transmitted from the memory 280 to IM bus 950.

The parity engine 260 can perform parity functionality of a certain RAID level in response to the instruction of the CPU 242. Of course, the parity engine 260 can be shut off and perform no parity functionality at all in some situation, for example, in a RAID level 0 case. A internal local bus 990 will connect the CPU interface 910 and other low speed device interface.

The internal registers 984 are provided to register status of CPU chipset/parity engine 244A and for controlling the traffic on the IM bus 950. In addition, a pair of UART functionality blocks 986 are provided so that CPU chipset/parity engine 244A can communicate with outside through RS232 interface.

The TCP/IP DMA block 980 will provide the function of checksum calculation and DMA operation. The arbiter 982 will arbitrate the usage of IM bus 950.

In an alternative embodiment, PCI-E interfaces can be used in place of the PCI-X interfaces 930, 932. In another alternative embodiment, PCI interfaces can be used in place of the PCI-X interfaces 930, 932. Those skilled in the art will know such replacement can be easily accomplished without any difficulty.

Figure 5A:
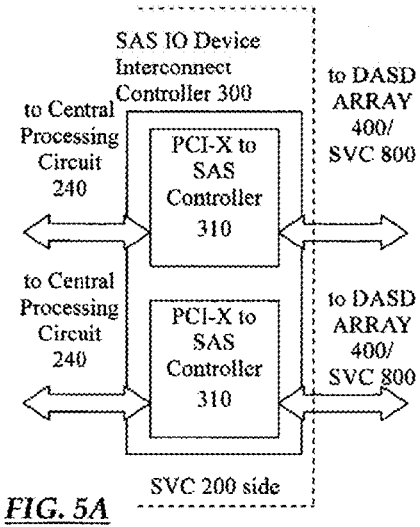
FIG. 5A is a block diagram illustrating a first embodiment of the SAS IO device interconnect controller used in FIG. 2B.

FIG. 5A is a block diagram illustrating a first embodiment of the SAS IO device interconnect controller 300 used in FIG. 2A. According to the present embodiment, the SAS IO device interconnect controller 300 comprises two PCI-X to SAS controller 310.

Figure 6A:
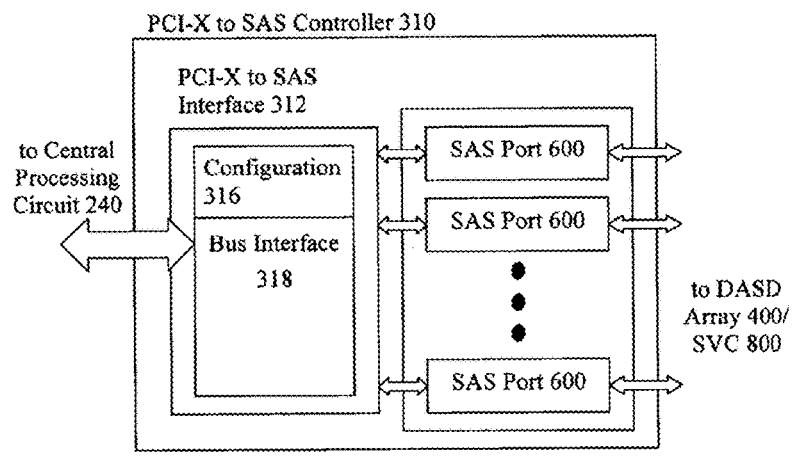
FIG. 6A is a block diagram illustrating an embodiment of the PCI-X to SAS controller 310.

FIG. 6A is a block diagram illustrating an embodiment of the PCI-X to SAS controller 310 of FIG. 5A. As shown in FIG. 6A, each PCI-X to SAS controller 310 contains a PCI-X interface 312 connected to the CPC 240 and the SAS ports 600 connected to the PCI-X interface 312. The PCI-X interface 312 comprises a bus interface 318 connecting to SAS ports 600 and a configuration circuitry 316 storing the configuration of the PCI-X to SAS controller 310. The SAS port 600 can be connected to the DASD array 400 and/or the SVC 800.

Figure 8A:
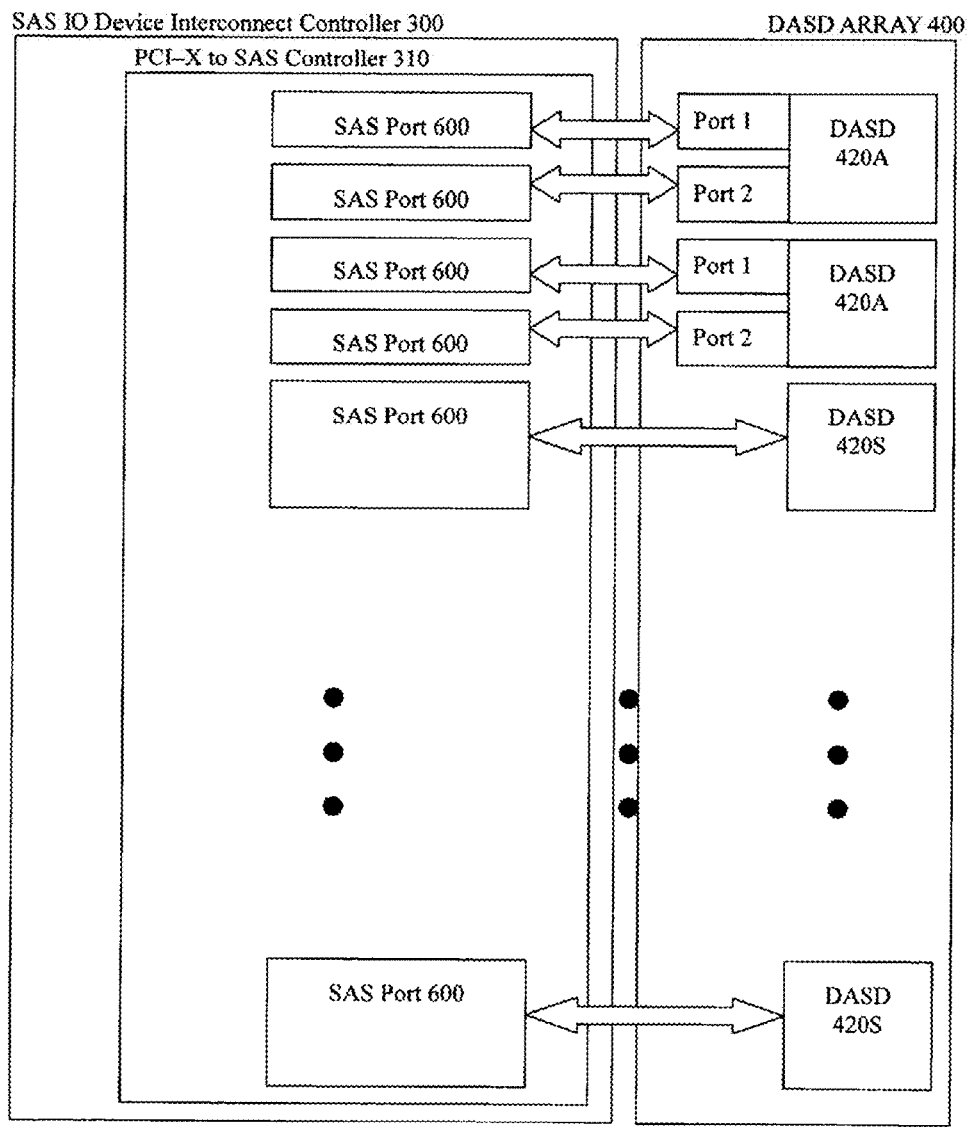
FIG. 8A is a block diagram illustrating in more detail the connection between SAS IO Device Interconnect Controller 300 and DASD array 400 in FIG. 2B.

FIG. 8A is a block diagram illustrating in more detail the connection between SAS IO Device Interconnect Controller 300 and DASD array 400 in FIG. 2B. Through a SAS port 600 of the PCI-X to SAS Controller 310, the data and control signals are transmitted to the DASD 420. The SAS port 600 can be directly connected to either a SAS port of a SAS DASD 420A or a SATA port of a SATA DASD 420S. In addition, since there are two separate ports, port 1 and port 2, on each SAS DASD 420A, two different SAS ports on the PCI-X to SAS controller 310 (or even on different PCI-X to SAS controllers 310, which is not shown in FIG. 8A) can be connected to a SAS DASD 420A through two different ports, which forms for a single SAS DASD 420A a redundant port pair having redundant interconnects to the SVC 200.

In an alternative embodiment, a PCI-Express (PCI-E for short) to SATA controller (not shown) can be used in place of the PCI-X to SATA controller 310. In the PCI-E to SATA controller, a PCI-E interface (not shown) is used in place of the PCI-X interface 312. In another alternative embodiment, a PCI to SATA controller can be used in place of the PCI-X to SATA controller 310. In the PCI to SATA controller, a PCI interface is used in place of the PCI-X interface 312. Those skilled in the art will know such replacement can be easily accomplished without any difficulty.

Figure 6B:
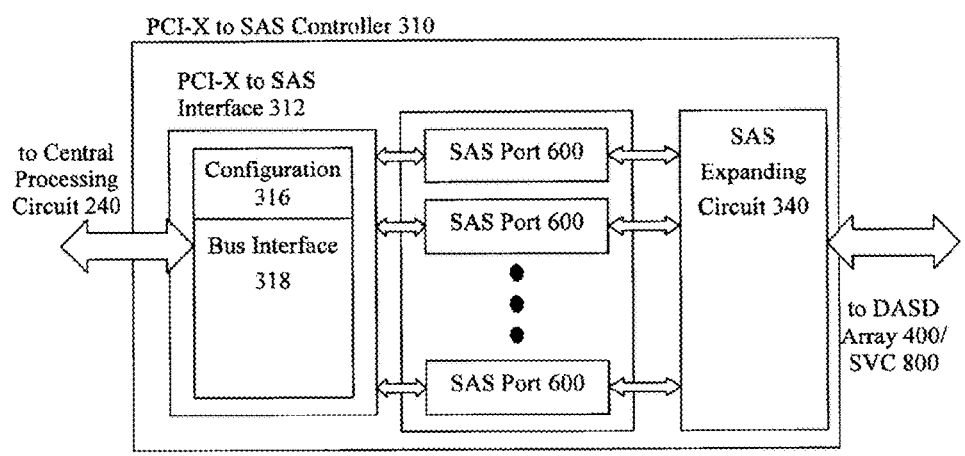
FIG. 6B is a block diagram illustrating a second embodiment of the PCI-X to SAS controller 310.
Figure 6C:
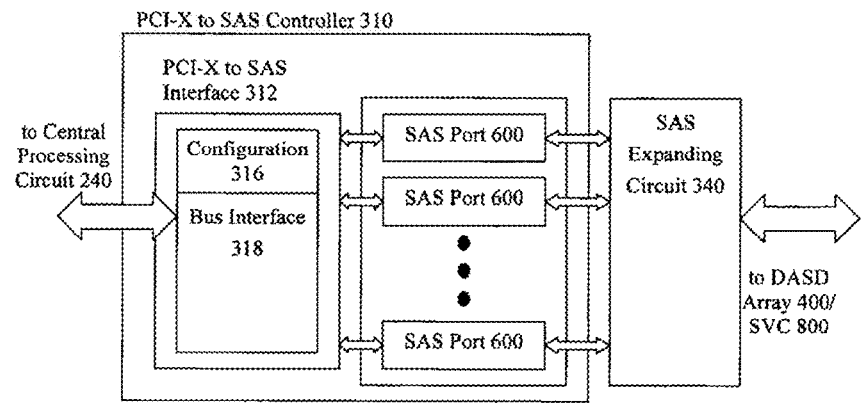
FIG. 6C is a block diagram illustrating a first implementation of connecting arrangement of the DASD array 400 to the PCI-X to SAS controller 310 of FIG. 6A.

FIG. 6B is a block diagram illustrating a second embodiment of the PCI-X to SAS controller 310 of FIG. 5A, which comprises a SAS expanding circuit 340 incorporated therein. A SAS expanding circuit 340 can be implemented as an edge expander device 315, as shown in FIG. 6E, which can connect to another one or two edge expander device and/or a plurality of end devices, such as SAS ports of one or more DASDs 420. Also, a SAS expanding circuit 340 can be implemented to contain one or more edge expander device sets each comprising a plurality of edge expander devices 315. In addition, a SAS expanding circuit 340 can be implemented as a fanout expander device containing a plurality of edge expander device sets each containing a plurality of edge expander devices 315.

The SAS expander device 315 comprises an expander connection block, a management function block, and a plurality Phy. The expander connection block provides the multiplexing functionality to connect each PHY for signal input and output. The management function block performs the SMP operation of expander. Through the expander device 315, a plurality of DASDs can be connected to a SAS controller 310, which improves the scalability of the storage volume of the SVS, while through the fanout expander device, a lot of edge expander device sets can be attached thereto, which largely enhances the volume scalability of the SVS.

Figure 6D:
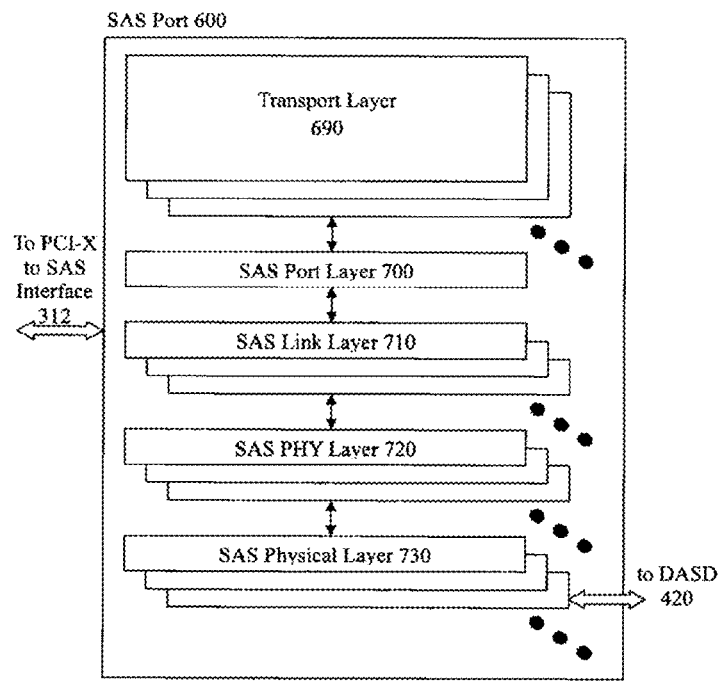
FIG. 6D is a block diagram illustrating an embodiment of the SAS port of FIG. 6A/6B/6C.
Figure 6E:
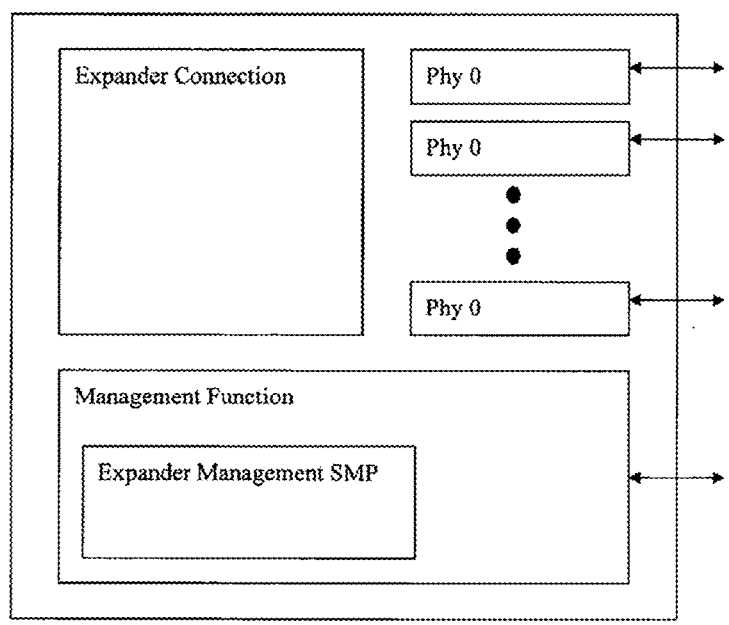
FIG. 6E is a block diagram illustrating an embodiment of the SAS expander device 315 used in the SAS expanding circuit 340 of FIG. 6B/6C.

FIG. 6D is a block diagram illustrating an embodiment of the SAS port 600 of FIG. 6A/6B. As shown in FIG. 6D, the SAS port comprises five parts: the transport layer 690, SAS port layer 700, SAS linker layer 710, SAS PHY layer 720, and SAS physical layer 730. The SAS physical layer 730 includes the SAS connector and cables, and SAS transmitting and receiving circuit. The SAS PHY layer 720 will cover the encoding scheme and the PHY reset sequence including OOB signaling and speed negotiation. The SAS link layer 710 will control the SAS PHY layer to manage connections with other SAS devices. The SAS port layer 700 locates between one or more SAS link layer and one or more SAS transport layers, receives and interprets requests and establishes connections by correct SAS link layers. The SAS transport layer 690 comprises SSP transport layer for serial SCSI application, STP transport layer for SATA application and SMP transport layer for management application.

A SAS port 600 contains one or more phys. It could be a "wide" port if there is more than one phy in the port or be a "narrow" port if there is only one phy. The link between SAS IO device interconnect controller 300 and expanding circuit 340 or DASD array 400 could be narrow link or wide link. A wide link can be configured to link between wide ports at both ends to enlarge the transmission bandwidth.

The physical layer 730 will transmit signals through a pair of differential signal lines, transmission lines LTX+, LTX−, to and receive signals through the other pair of differential signal lines, reception lines LRX+, LRX−, from the DASD controller in the DASD 420. The two signal lines of each pair of the signal lines, for example LTX+/LTX−, transmit signals TX+/TX− simultaneously at inverse voltage, for example, +V/−V or −V/+V, with respective to a reference voltage Vref so that the voltage difference will be +2V or −2V and thus to enhance the signal quality thereof. This is also applicable to the transmission of the reception signals RX+/RX− on reception lines LRX+, LRX−.

The phy layer 720 defines 8b/10b coding and OOB signals. All data bytes received from the physical layer 730 will be decoded the 8b/10b characters and removed the SOF, CR, EOF. A SAS phy 720 uses the OOB signals to identify and start the operational link connected to another SAS phy 720. After SAS link is operational, the SAS phy layer 720 signals the SAS link layer and the SAS link layer assumes control of the SAS phy layer 720 for communication, including identification sequence, connection management and frame transmission. There are two important constructs, SAS primitives and SAS frames used by SAS link layer.

A primitive consists of a single double-word and is the simplest unit of information that may be communicated between a host and a device. When the bytes in a primitive are encoded, the resulting pattern is not easy to be misinterpreted as another primitive or a random pattern. Primitives are used primarily to convey real-time state information, to control the transfer of information and to coordinate communication between the host and the device. The first byte of a primitive is a special character.

A frame consists of a plurality of double-words, and starts with an start primitive and ends with end primitive. The SAS address frame is used when a connection is not established and starts with SOAF (Start of Address Frame) and ends with EOAF (End of Address Frame).

Figure 9:
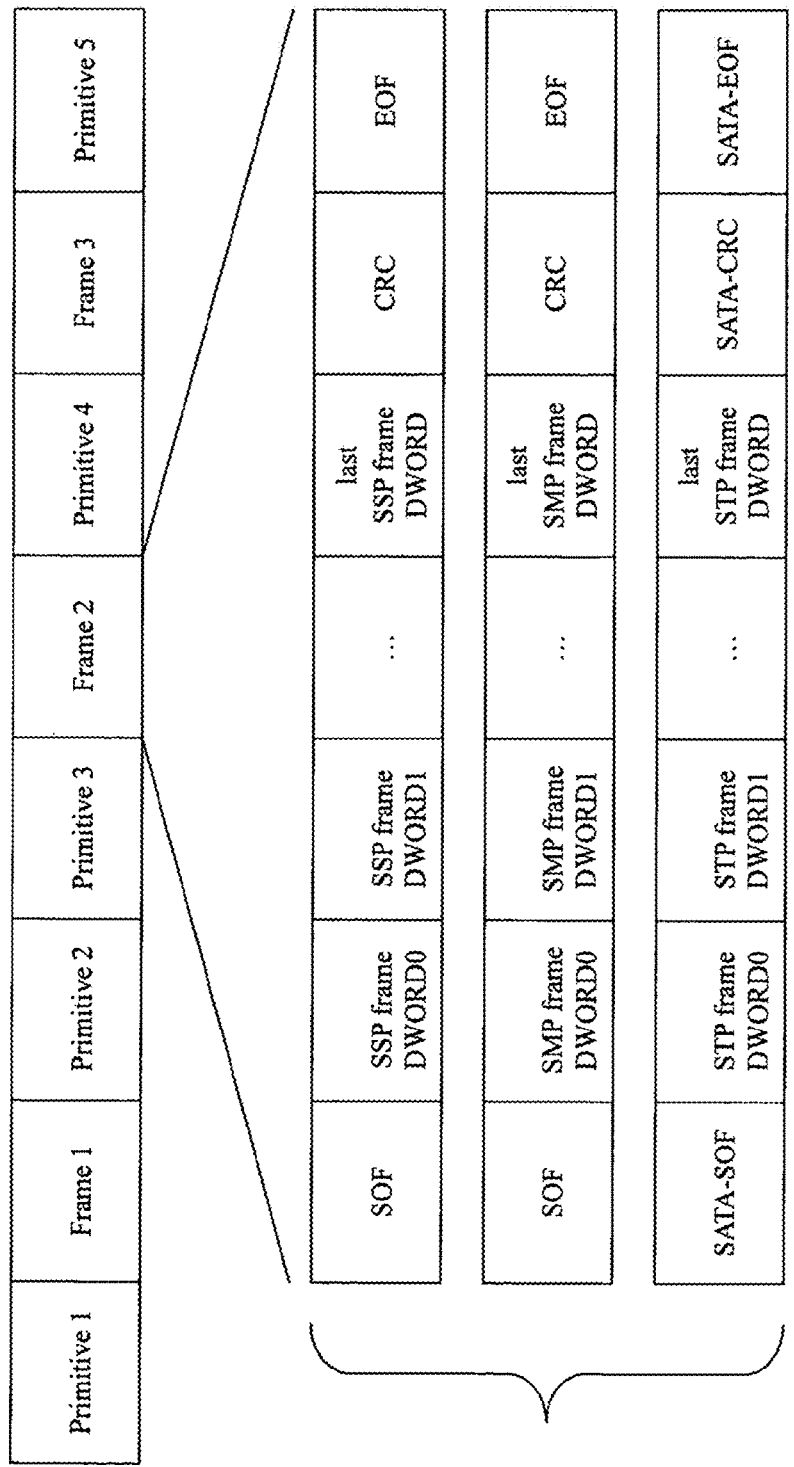
FIG. 9 illustrates a transmission structure complying with SAS protocol.

There are three types of connections supported by the SAS, including SSP frame for SAS device, STP frame for SATA device, and SMP frame for management. SSP frame and SMP frame starts with SOF (Start of Frame) and ends with EOF (End of Frame). STP frame starts with SATA SOF and ends with STAT EOF. These frames and a transmission structure complying with SAS protocol are illustrated in FIG. 9.

A CRC (Cyclic-Redundancy Check Code) is the last non-primitive double word immediately preceding the end primitive. CRC code will be calculated over the contents of the frame, all IO request information communicating between CPC 240 and the DASD 420 through the PCI-X to SAS Controller 310 will perform CRC checking. Hence, inadvertent data corruption (e.g., due to noise) during the transfer from SVC to PSD may be detected and recovered, preventing a potential catastrophic data corruption situation in which data gets written to the wrong section of media possibly due to corruption of the destination media section base address and/or media section length that are contained in the initial IO request data.

Figure 6F:
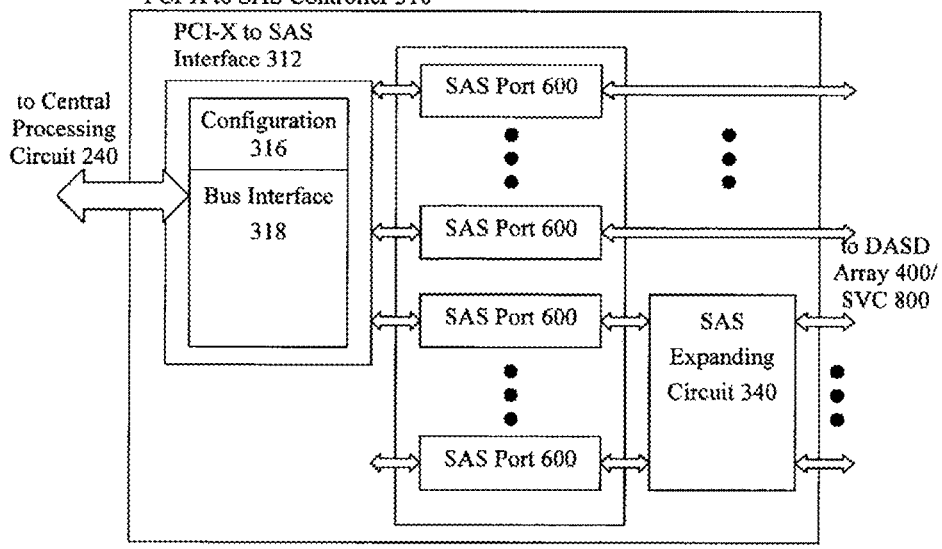
FIG. 6F is a block diagram illustrating a third embodiment of the PCI-X to SAS controller 310.

FIG. 6F is a block diagram illustrating a third embodiment of the PCI-X to SAS controller of FIG. 5A. In this embodiment, some of the SAS ports 600 are connected to the expanding circuit 340 and some of the SAS ports 600 are provided for direct connecting to the DASDs 420, and/or some of the SAS ports 600 are connected to the SVC 800. In addition, the expanding circuit 340 can be further connected to the DASDs 420 and/or the SVC 800.

Figure 5B:
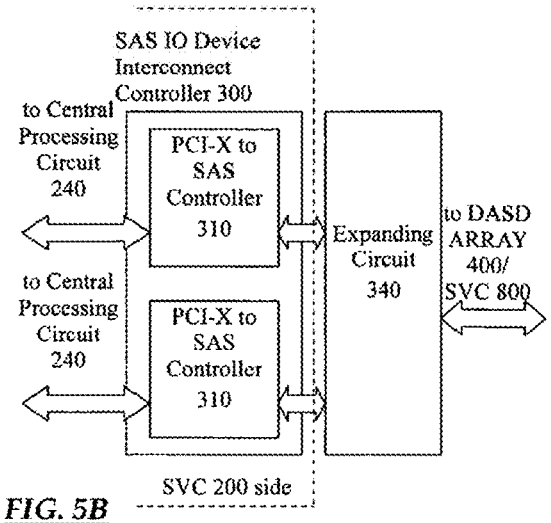
FIG. 5B is a block diagram illustrating a second embodiment of the SAS IO device interconnect controller used in FIG. 2A.

FIG. 5B is a block diagram illustrating a second embodiment of the SAS Controller of FIG. 2A according to the present invention, in which the expanding circuit 340 is provided between the PCI-X to SAS controller 310 and the DASD array 400.

FIG. 6C is a block diagram illustrating a first implementation of connecting arrangement of the DASD array 400 to the PCI-X to SAS controller 310 of FIG. 5B or FIG. 6A, in which the SAS expanding circuit 340 is not provided in the PCI-X to SAS controller 310 but rather provided as a separate device which can be attached to the PCI-X to SAS controller 310 as an interface/controller to the DASD ARRAY 400 or another SAS expanding circuit 340.

Figure 6G:
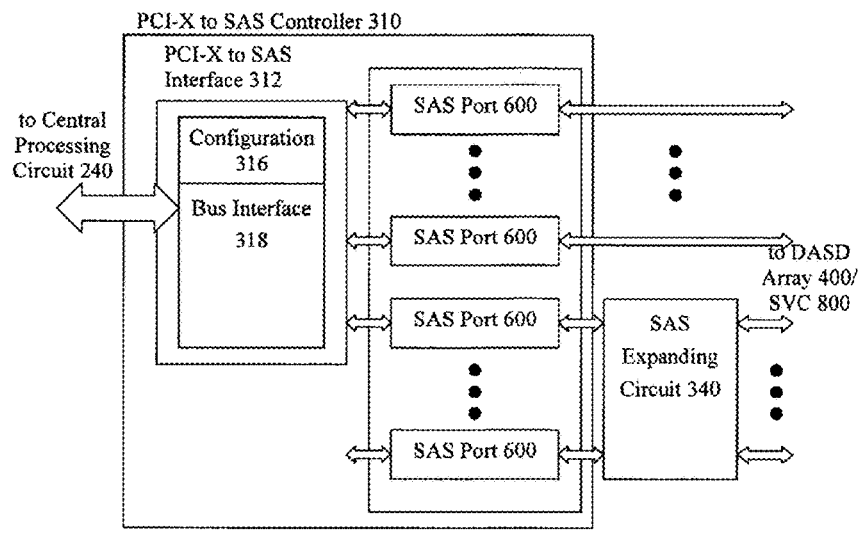
FIG. 6G is a block diagram illustrating a second implementation connecting arrangement of the DASD array 400 to the PCI-X to SAS controller 310 of FIG. 6A.

FIG. 6G is a block diagram illustrating a second implementation of connecting arrangement of the DASD array 400 to the PCI-X to SAS controller 310 of FIG. 5B or FIG. 6A, in which the SAS expanding circuit 340 is not provided in the PCI-X to SAS controller 310 but rather provided as a separate device. In this embodiment, some of the SAS ports 600 are connected to the expanding circuit 340 and some of the SAS ports 600 are provided for direct connecting to the DASDs 420, and/or some of the SAS ports 600 are connected to the SVC 800. In addition, the expanding circuit 340 can be further connected to the DASDs 420 and/or the SVC 800.

Figure 8B:
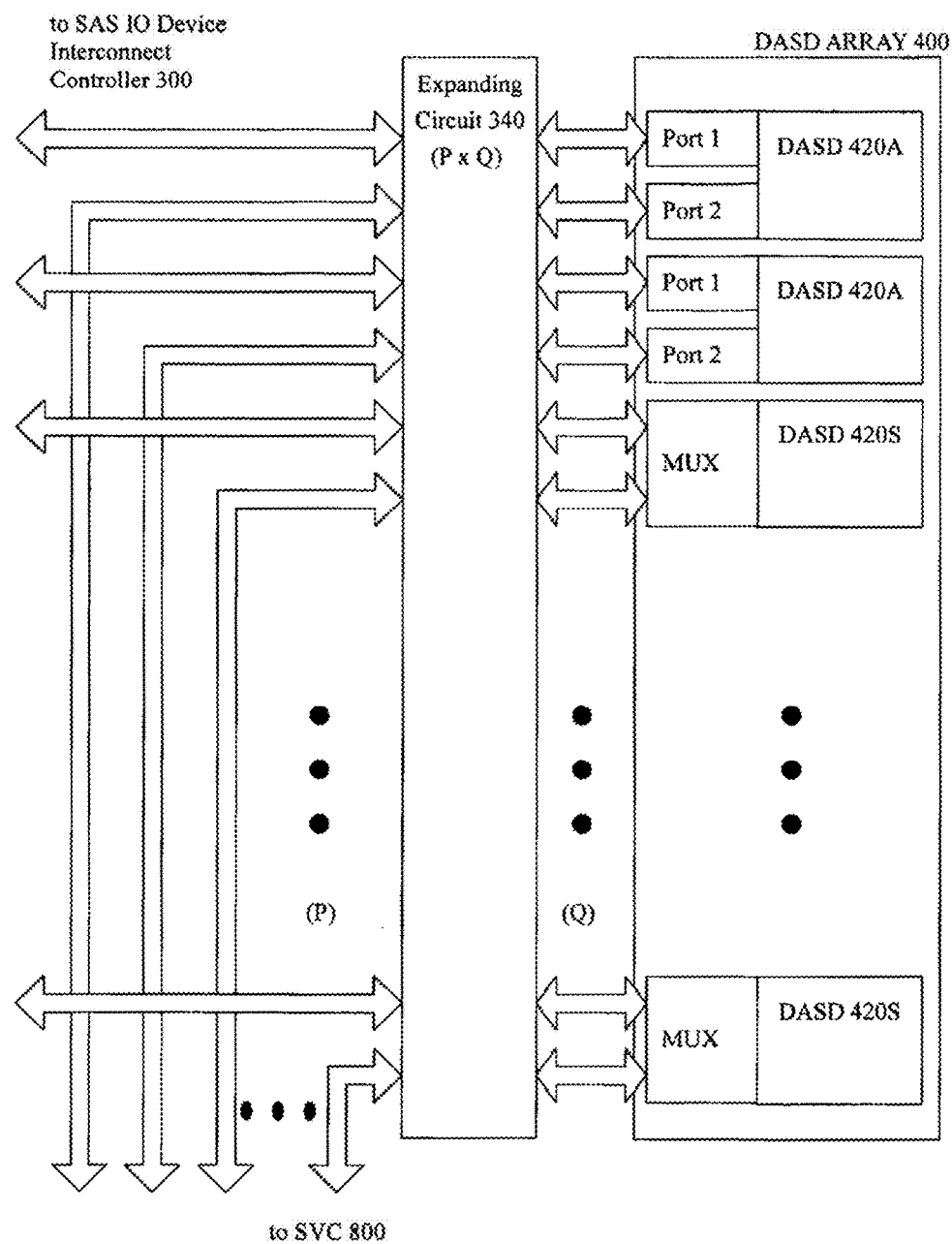
FIG. 8B is a block diagram illustrating in more detail the connecting arrangement between the expanding circuit and other functional blocks in FIG. 2A.

FIG. 8B is a block diagram illustrating in more detail the connection between the expanding circuit 340 and other functional blocks in FIG. 2A and FIG. 5B, or FIGS. 6B/6C/6G. The expanding circuit 340 can receive the command/data from the SAS IO device interconnect controller 300 and transfer them to the DASD array 400 and/or to SVC 800.

Figure 5C:
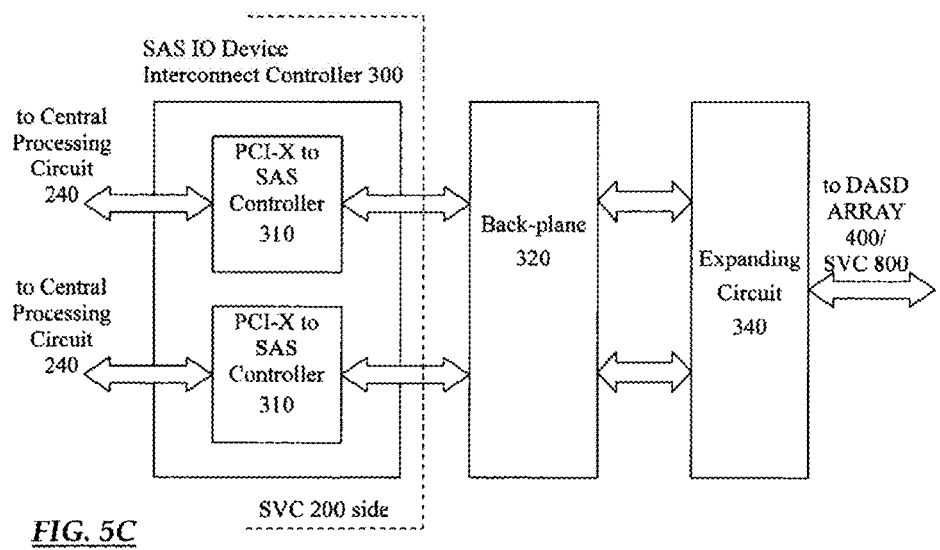
FIG. 5C is a block diagram illustrating a third embodiment of the SAS IO device interconnect controller used in FIG. 2C.
Figure 8C:
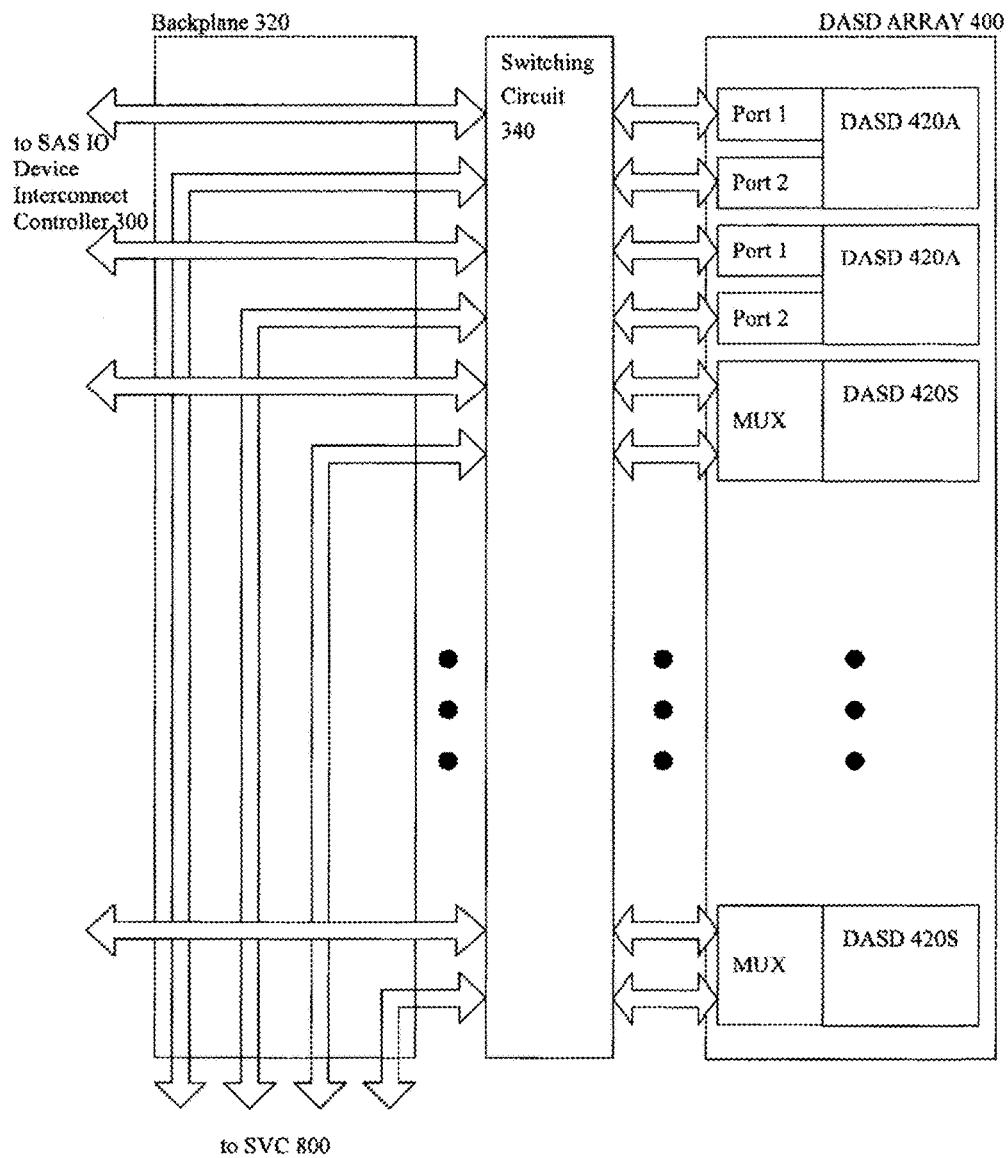
FIG. 8C is a block diagram illustrating in more detail the connecting arrangement between the backplane, the expanding circuit and other functional blocks in FIG. 2C.

FIG. 5C is a block diagram illustrating a third embodiment of the SAS Controller of FIG. 2C according to the present invention, in which the PCI-X to SAS controller 310 is connected to a backplane 320 and then to the expanding circuit 340 and finally, to the DASD array 400. FIG. 8C is a block diagram illustrating in more detail the connection between the backplane, the expanding circuit and other functional blocks in FIG. 2C and FIG. 5C. In this arrangement, the expanding circuit 340 is the same as that in the FIG. 5B; the backplane 320, however, provides a robust circuit board with electric wiring and connectors thereon so as to strengthen the connection between the SAS IO device interconnect controller 300 and the expanding circuit 340 and to facilitate attachment and detachment with respect to the SAS IO device interconnect controller 300.

Although the embodiments of the SAS Controller 300 disclosed in FIGS. 5A through 5C include two PCI-X to SAS controller 310, the SAS Controller 300 according to the present invention may also include one or more than two controller 310 in other embodiments thereof, depending on performance considerations, engineering considerations, and/or cost or market considerations. Those skilled in the art will know such adjustments and considerations can be easily accomplished without any difficulty.

FIGS. 7A through 7F show various block diagrams exemplifying the CPC according to the present invention and the connection thereof to other functional blocks of the SVC.

Figure 7A:
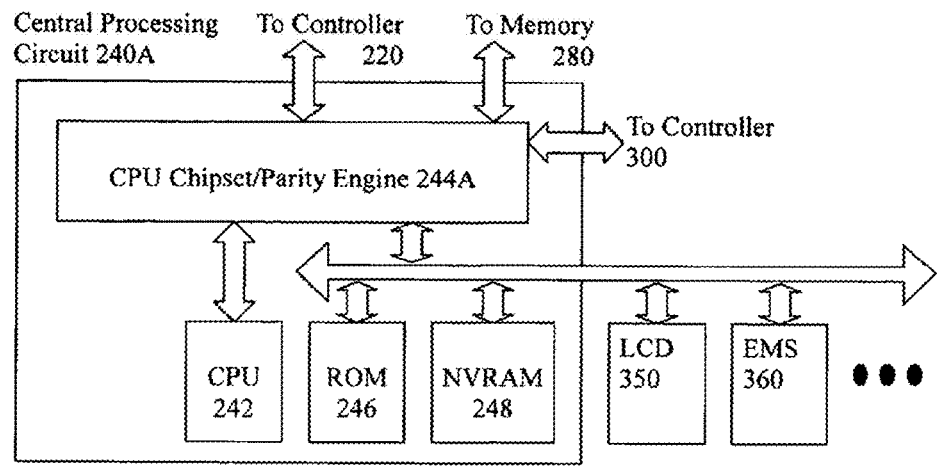
FIGS. 7A through 7F show various block diagrams exemplifying the CPC according to the present invention and the connection thereof to other functional blocks of the SVC.

In FIG. 7A, the first embodiment of the CPC block is shown as the CPC 240A, comprising the CPU chipset/parity engine 244A, the CPU 242, a ROM (Read Only Memory) 246, a NVRAM (Non-volatile RAM) 248, an LCD 350 and an enclosure management service circuitry EMS 360. The CPU can be, e. g., a Power PC. The ROM 246 can be a FLASH memory for storing BIOS and/or other programs. The NVRAM is provided for saving some information regarding the IO operation execution status of the disk which can be examined after an abnormal power shut-off occurs and meanwhile the IO operation execution does not complete. LCD module 350 shows the operation of the subsystem LCDs. EMS 360 can control the power of the DASA array and do some other management. The ROM 246, the NVRAM 248, the LCD 350 and the enclosure management service circuitry EMS 360 are connected to the CPU chipset/parity engine 244A through an X-bus. The CPU chipset/parity engine 244A has been explained earlier with FIG. 4.

Figure 7B:
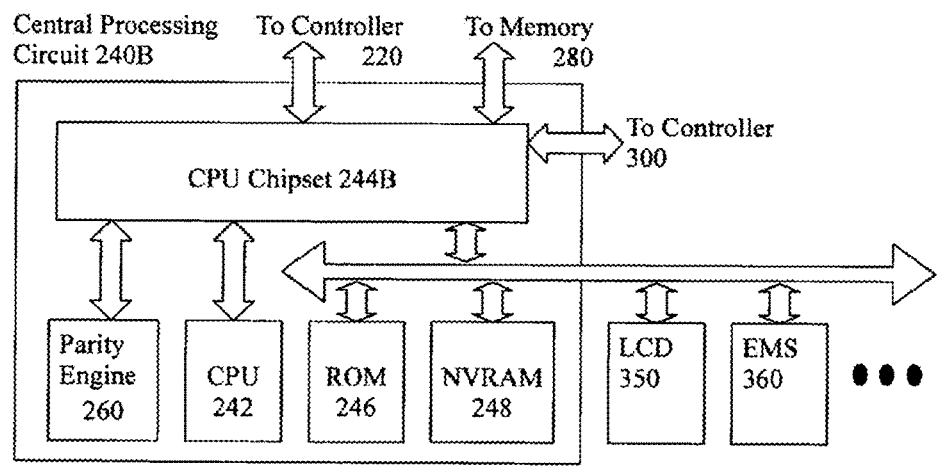

In FIG. 7B, the second embodiment of the CPC block is shown as the CPC 240B, comprising a CPU chipset 244B, the parity engine 260, the CPU 242, a ROM 246, a NVRAM 248, an LCD 350 and an enclosure management service circuitry EMS 360. The second embodiment CPC 240B is similar to CPC 240A, except that in CPC 240B, CPU chipset 244B and parity engine 260 are two separate chips.

Figure 7C:
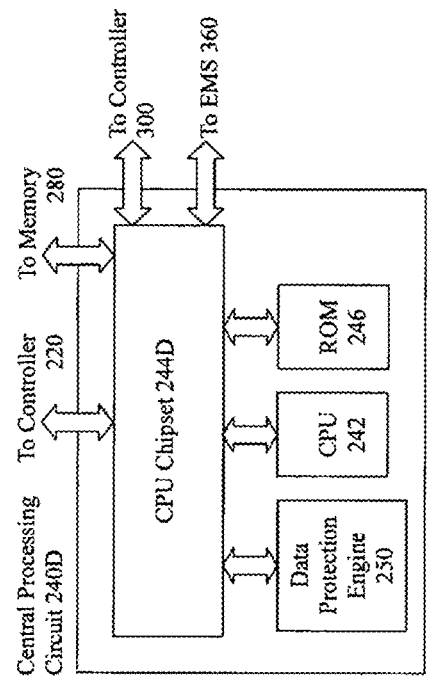

In FIG. 7C, the third embodiment of the CPC block is shown as the CPC 240C, mainly comprising the CPU chipset 244C, the CPU 242, and the ROM 246. The NVRAM 248 and LCD 350, though omitted in the FIG. 7C, each could be a part of the CPC 240C. In this embodiment, the parity engine is omitted. The CPC 240 can do without a parity engine if such functionality is not required by the SVC 200 or SVS 20. For example, for a JBOD emulator controller without parity function or subsystem X thereof, or, a RAID level 1 controller or subsystem thereof, no parity functionality is required, and thus parity functionality can be omitted. In another scenario, where the parity function is performed by the CPU which executes some parity function programs or codes rather than by a dedicated hardware like a parity engine, parity engine can be omitted. This could be a low performance but low cost solution for the parity functionality.

Figure 7D:
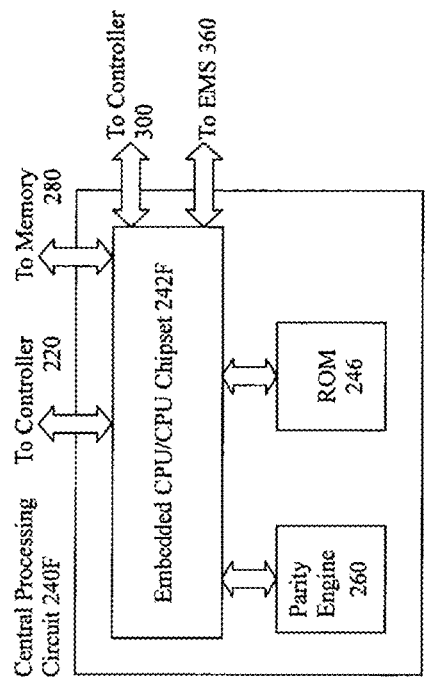

In FIG. 7D, the fourth embodiment of the CPC block is shown as the CPC 240, mainly comprising the CPU chipset 244D, A data protection engine 250, the CPU 242, and the ROM 246. The NVRAM 248 and LCD 350, though omitted in the FIG. 7D, each could be a part of the CPC 240D. Comparison with CPC 240C, CPC 240D further comprises a data protection engine 250, which can perform a data protection function more than and/or other than a parity function shown in FIG. 7B. For example, the data protection engine 250 may have an ECC (error correcting code) function.

Figure 7E:
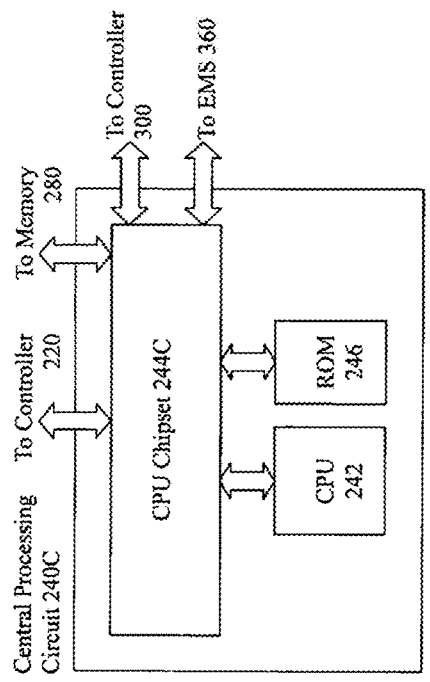

In FIG. 7E, the fifth embodiment of the CPC block is shown as the CPC 240E, mainly comprising the CPU chipset/ROM 244E, the parity engine 260, the CPU 242, and the ROM 246. The NVRAM 248 and LCD 350, though omitted in the FIG. 7E, each could be a part of the CPC 240E. Comparison with CPC 240C, CPC 240E further comprises the parity engine 260. The ROM is embedded made in the CPU chipset/ROM 244E chip. Or, the ROM is integrally provided in the CPU chipset/ROM 244E chip.

Figure 7F:
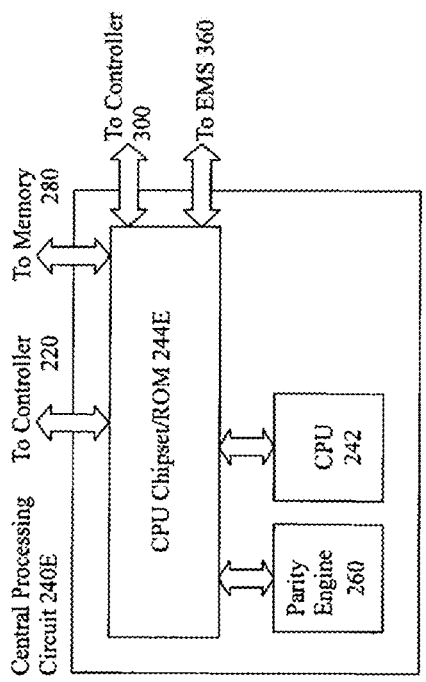

In FIG. 7F, the sixth embodiment of the CPC block is shown as the CPC 240F, mainly comprising the Embedded CPU/CPU chipset 242F, the parity engine 260, and the ROM 246. The NVRAM 248 and LCD 350, though omitted in the FIG. 7F, each could be a part of the CPC 240F. Comparison with CPC 240E, CPC 240F further comprises the parity engine 260 and the ROM 246 each separated from the Embedded CPU/CPU chipset 242F. The CPU is embedded made in the embedded CPU/CPU chipset 242F chip.

FIGS. 7A through 7F show only a few block diagrams exemplifying the CPC 240, other variations and/or modifications which can be easily made by those skilled in the art, should be considered as a portion of the present invention. For example, according to the trend of SOC (System On Chip), all the functional blocks in the CPC 240 can be formed integrally in one chip or embedded in a single die.

Further details of the operation flows and certain detail structure of the present invention are explained with FIG. 12 through FIG. 21 as follows.

Please refer to FIG. 12, where another diagram of an embodiment of a storage virtualization computer system comprising a redundant external SAS storage virtualization subsystem 20 according to the present invention is illustrated. As shown in FIG. 12, the storage virtualization computer system 10 comprises a host entity 10 and the redundant external SAS storage virtualization subsystem 20. The redundant external SAS storage virtualization subsystem 20 comprises a pair of SVCs, SVC1 and SVC2, configured into a redundant SVC pair such that when one of the SVCs is in trouble, such as being blocked, malfunctioning or in failure, the other SVC will automatically take over the functionality of troubled SVC.

The detail of most of the hardware architecture has been explained earlier according to FIG. 1 through FIG. 12B.

In FIG. 12, there are two types of DASDs connected to the SVCs. The first type is SAS DASD, which can be connected to both SVCs directly by the native dual SAS ports. The second type is SATA DASD, which can be connected by an access control switch 342 to both SVCs.

The design of access control switch 342 in SAS IO device could be a port selector. A SVC can issue commands to a PSD 420 and the port selector can switch the correct path from the SVC to PSD 420 automatically.

Figure 13:
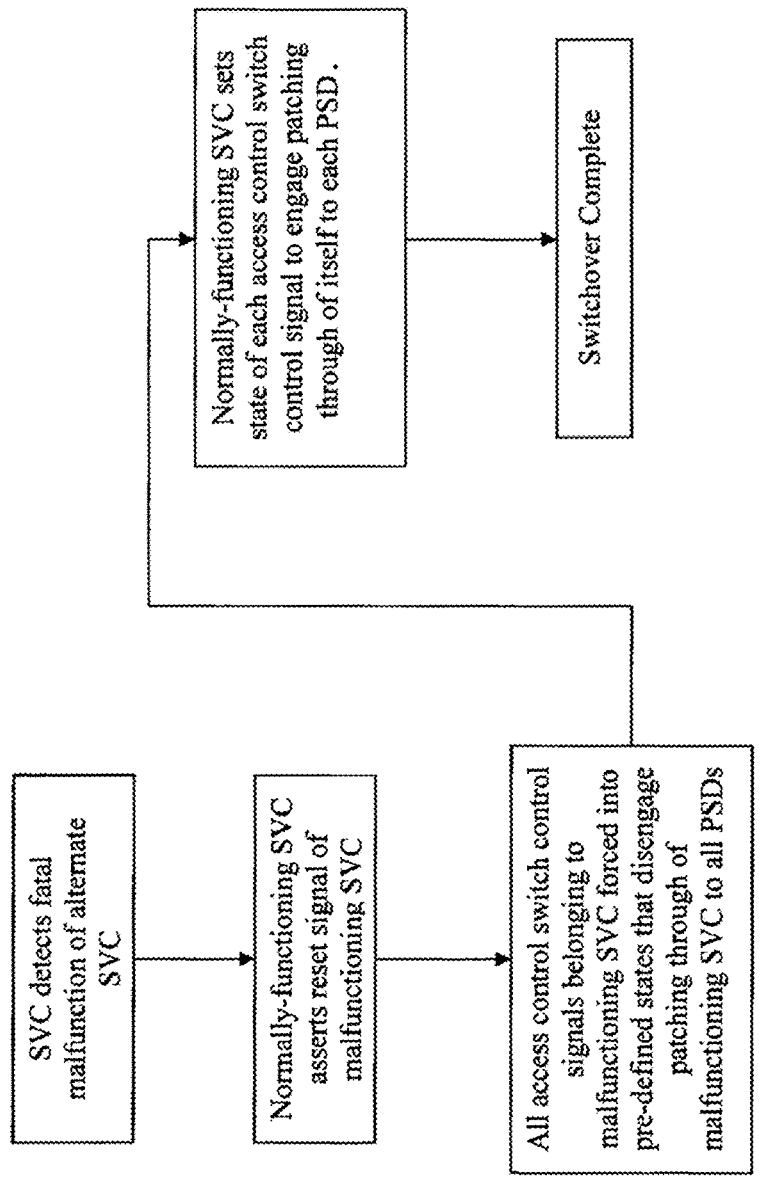
FIG. 13 is a flowchart of a mandatory switchover process when one SVC in the SVC pair malfunctions.

A condition under which switchover of access ownership to allow one of the SVCs to access a PSD would be mandated is when the access owner SVC 200 malfunctions in such a way that the alternate SVC 200 must take over its functions. FIG. 13 diagrams the process of switchover of the access ownership in this case. On detection of malfunction of the malfunctioning SVC 200, the alternate SVC 200 asserts the malfunctioning SVCs reset signal to completely incapacitate it and to force all external signal lines into pre-defined states. One such external signal line is the access control switch control signal of the malfunctioning SVC 200. On assertion of the SVC reset signal, this signal line is set to a state that enables the patching through of the surviving SVC 200 to the PSD 420. Following the assertion of the malfunctioning SVC reset signal, the surviving SVC 200 sets the state of its access control switch control signal to engage patching through of itself to the PSD 420. This completes the switchover process.

The access control switch 342 will remain in this state until the malfunctioning SVC 200 is replaced or brought back on line and requests ownership to be transferred over to it. The state of the access control switch signal line for each controller at reset, power-up, and during initialization remains such as to disable patching through of itself to the PSD 420 to insure that it does not interfere with potentially on-going PSD 420 accesses by the on-line SVC 200 by inadvertently forcing the access control switch 342 into a state that disrupts such accesses.

Figure 14:
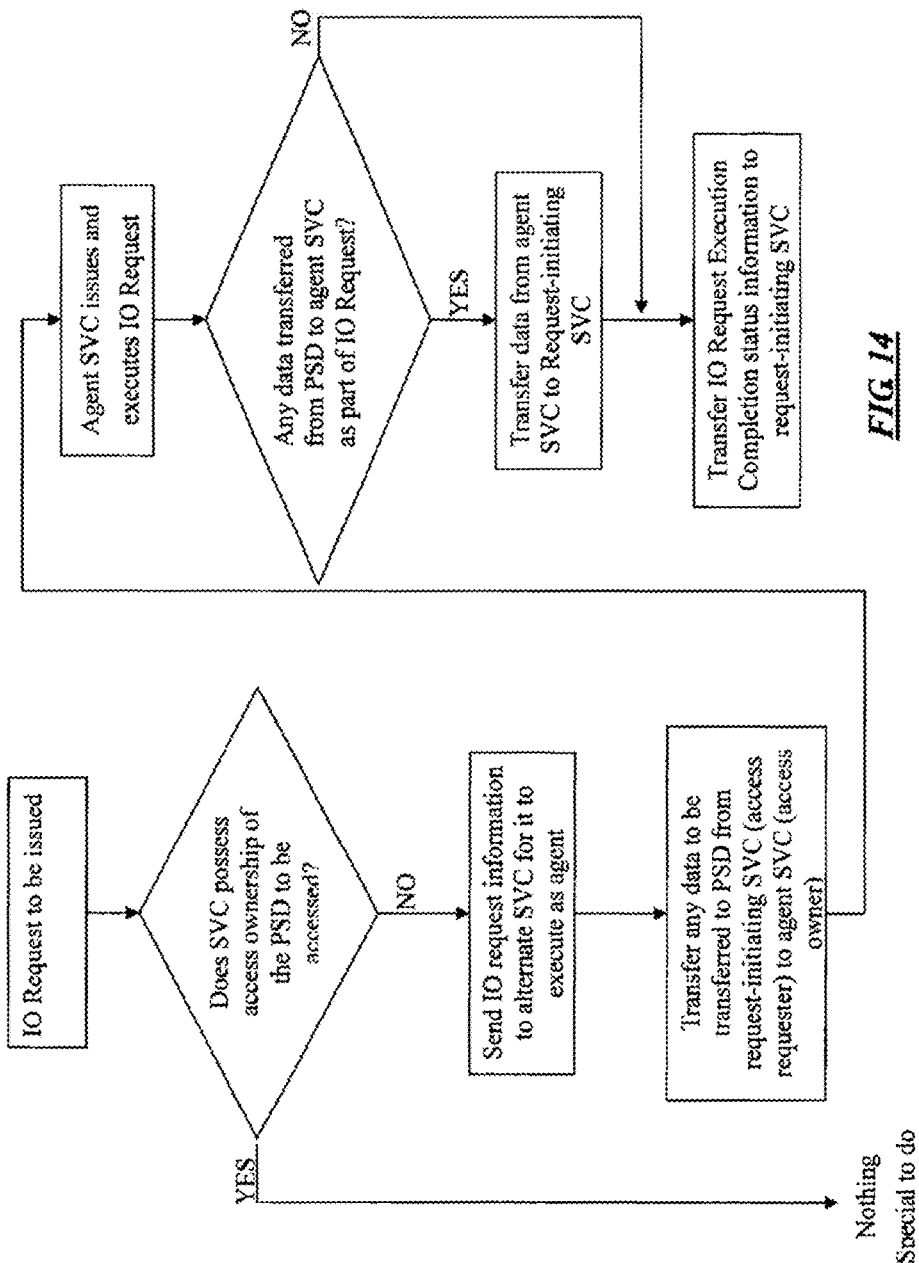
FIG. 14 is a flow chart of an IO request routing.

An alternate method of handling "occasional" access requirements on the part of the SVCs 200 that does not normally have access ownership of the PSD 420 is to have the access owner act as an agent for issuing the IO requests that the SVC 200 requiring access, termed access requester, needs to have executed, an operation termed here as "IO Request Rerouting". This would typically entail transferring all the necessary IO request information to the access owner for it to construct into an IO request to issue to the PSD 420 for the access requester. In addition to the IO request information, the access requester would transfer any payload data to be written to the PSD to the access owner before or during IO request issuance and execution. Any payload data being read from the PSD would be transferred back to the access requester during or after IO request execution. Completion status of the operation, typically information that indicates whether the operation "succeeded" or "failed" and for what reason, would be passed back to the access requester on completion of the IO request execution. FIG. 14 depicts such a flow chart.

IO request rerouting function can be performed through a redundant IO device interconnect port pair. Each member port of the IO device interconnect port pair is provided on a separate SVC of the redundant SVC pair but connected to the same PSD through the IO device interconnect. A member port of the redundant IO device interconnect port pair can be a device-side IO device interconnect port, or a hybrid IO device interconnect port which acts as a device-side IO device interconnect port for some IO operations and as a host-side IO device interconnect port for other IO operations. In this regard, the member ports of the redundant IO device interconnect port pair could consist of point-to-point IO device interconnect ports, such as SAS interconnects, or alternately, could consist of multiple-device IO device interconnect ports, such as Fibre Channel or Parallel SCSI interconnects. In addition, such IO request rerouting function can also be applied to the situation that IO requests are performed through the complementary expansion ports of the redundant SVC pair. The complementary expansion ports of the redundant SVC pair will be recited in further detail later with FIG. 15 through FIG. 18.

In order to connect more PSDs, the current invention optionally includes one or more expansion device-side multiple-device IO device interconnects, herein referred to as device-side expansion ports, such as Parallel SCSI or Fibre FC-AL, on the SVC. These interconnects would typically be wired in such a way as to allow external connection of external expansion chassis. These chassis could be simple "native" JBODs of PSDs directly connected to the interconnect without any intervening conversion circuitry or could be intelligent JBOD emulation subsystems that emulate "native" JBODs using a combination of SAS or SATA PSDs and a single or redundant set of SVCs that provide the conversion from the multiple-device IO device interconnect protocol that provides the connection of the JBOD subsystem to the primary storage virtualization subsystem to the device-side IO device interconnect (SAS or SATA) protocol that provides the connection between the JBOD SVC(s) and the PSDs that they manage.

Figure 15A:
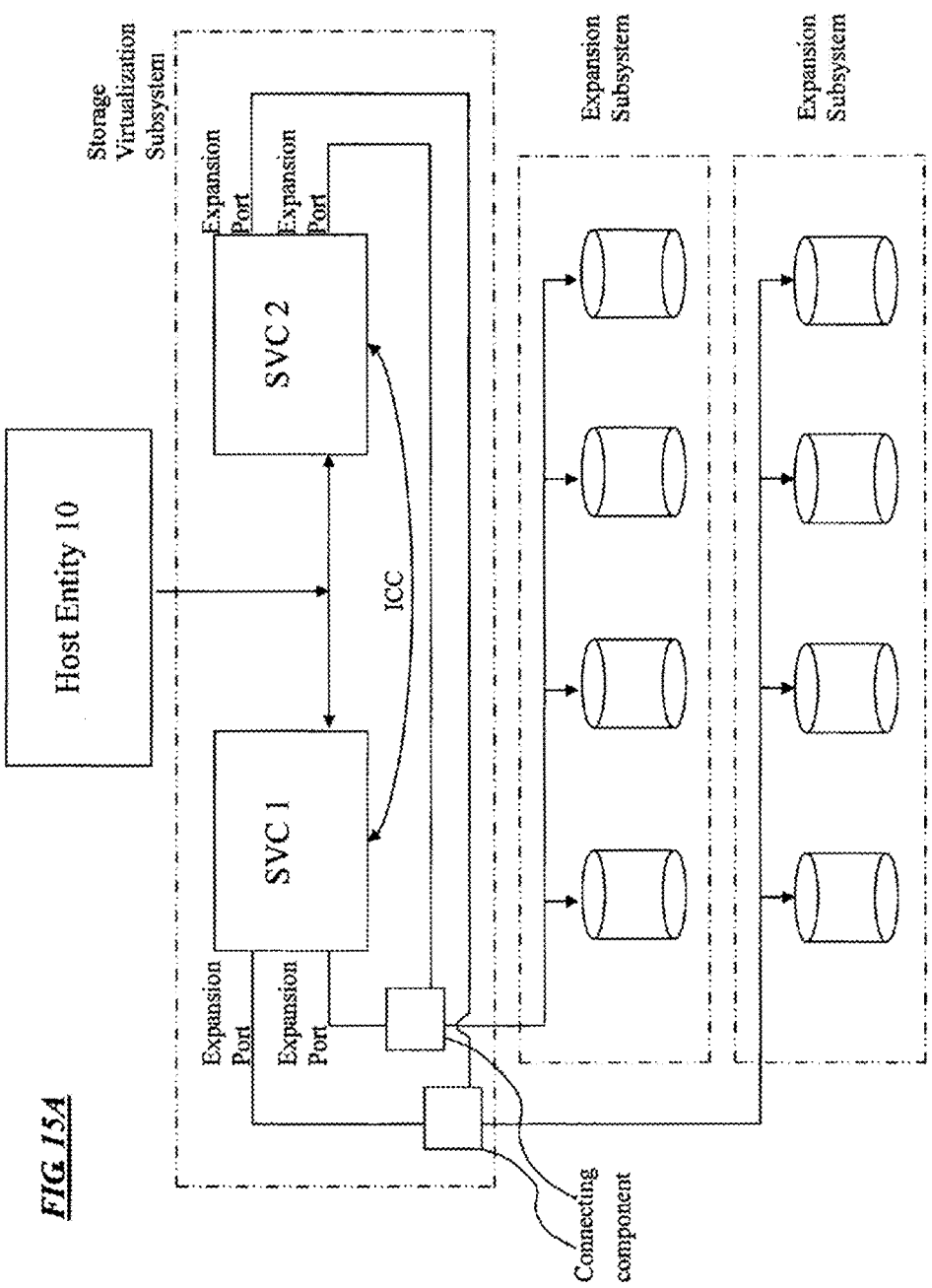
FIG. 15A is a block diagram of a redundant SVC interconnected expansion port implementation.

The current invention introduces three possible options for wiring of the device-side expansion ports. FIG. 15A depicts an implementation in which each device-side expansion port on one SVC is interconnected with its complement on the other SVC, referred to here as redundant SVC interconnected expansion port implementation. This allows both SVCs to share the device-side interconnect and the bandwidth it provides during normal operation and allows both SVCs full access to each storage unit port via the connecting component, which acts like a hub. It further allows either SVC to retain full access to all of the storage units, including those that were originally assigned to the alternate SVC, even in the event of an alternate SVC malfunction.

Figure 15B:
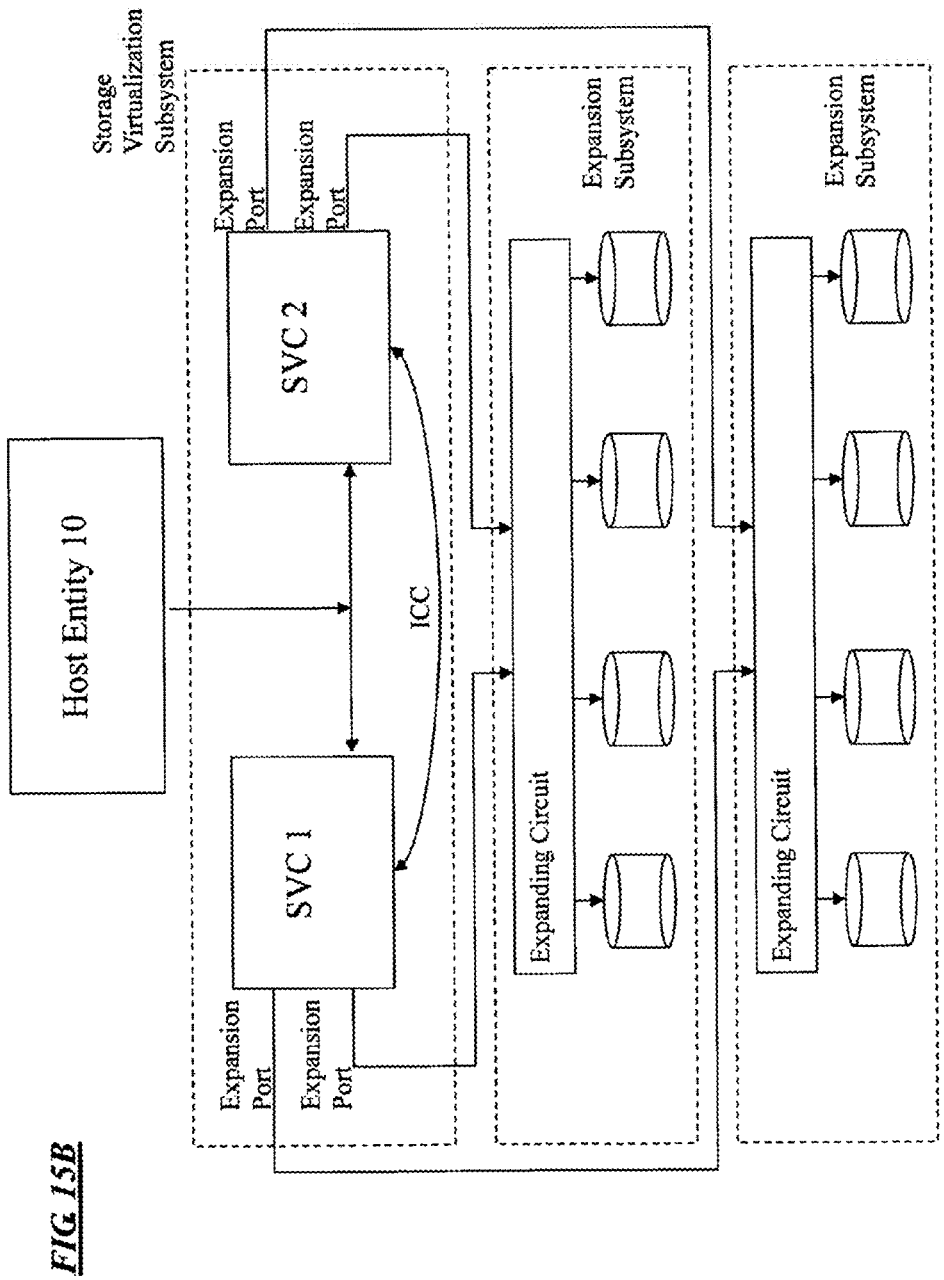
FIG. 15B and FIG. 15C are block diagrams of further implementations showing redundant SVC interconnected expansion ports.
Figure 15C:
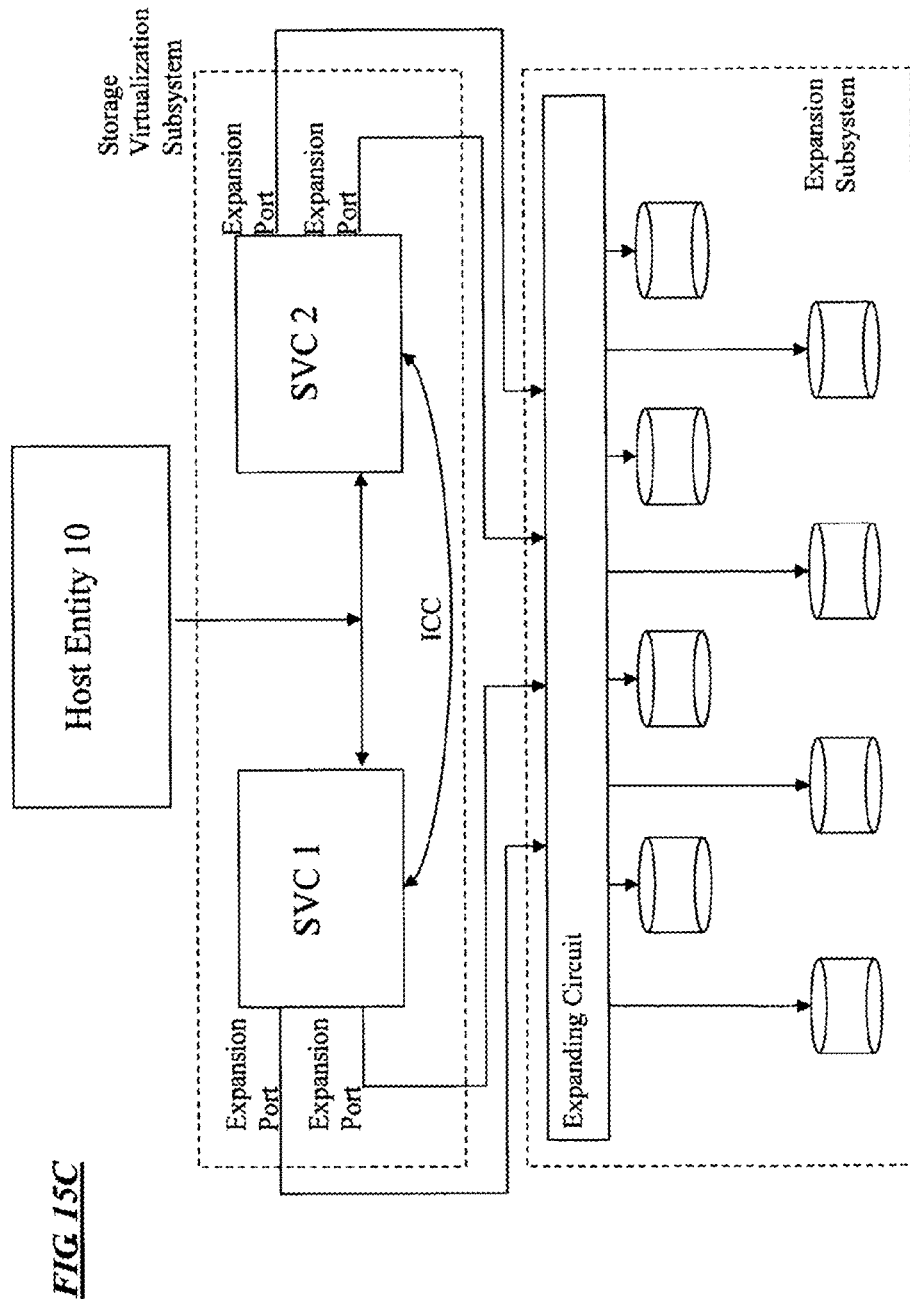

FIG. 15B and FIG. 15C show implementations similar to FIG. 15A but using of an expanding circuit instead of the connecting component. In the implementation shown in FIG. 15B, each redundant expansion port pair (the two expansion ports from different SVCs and connecting to the same connecting component) is provided with an expanding circuit. In the implementation shown in FIG. 15C, all redundant expansion ports are connected to a same expanding circuit.

Figure 16A:
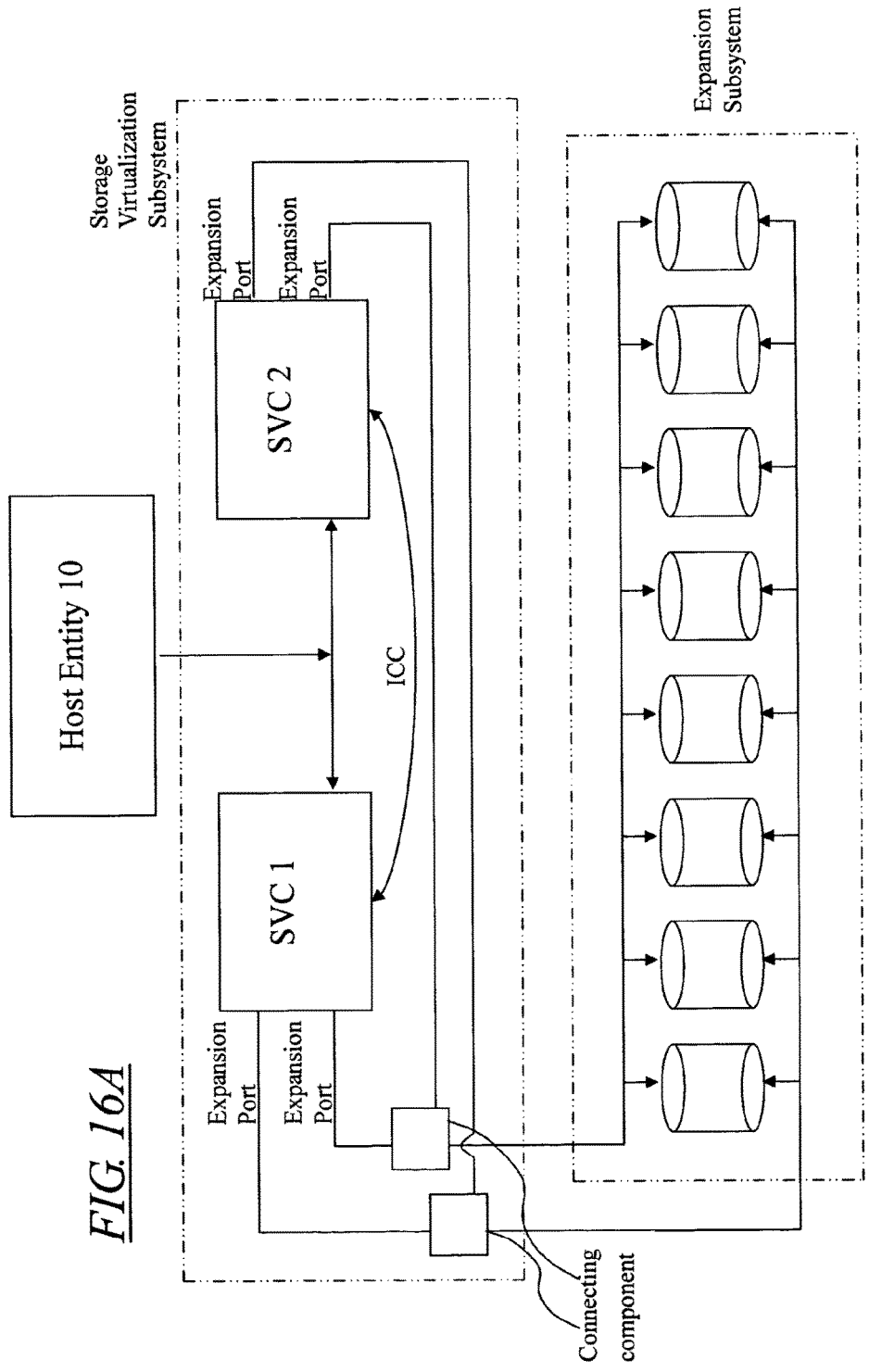
FIG. 16A is a block diagram of a redundant SVC interconnected redundant expansion port implementation.

An enhanced such implementation is depicted in FIG. 16A, referred to here as the redundant SVC interconnected redundant expansion port implementation, would have pairs of redundant expansion ports rather than independent ports in order to keep a break or malfunctioning in an interconnect that services the expansion port of an SVC from causing a complete loss of access by the SVC to storage units connected on the interconnect. In such a configuration, each port in a redundant pair would connect to one of the ports in each of the dual-ported PSDs connected onto the interconnect or to one of the ports in a dual-ported storage virtualization subsystem that emulates a multiplicity of PSDs connected onto the interconnect (e.g., JBOD emulation storage virtualization subsystem). Should one of the expansion ports or the connected interconnects malfunction on an SVC, requests would be rerouted through the other expansion-port/interconnect.

Figure 16B:
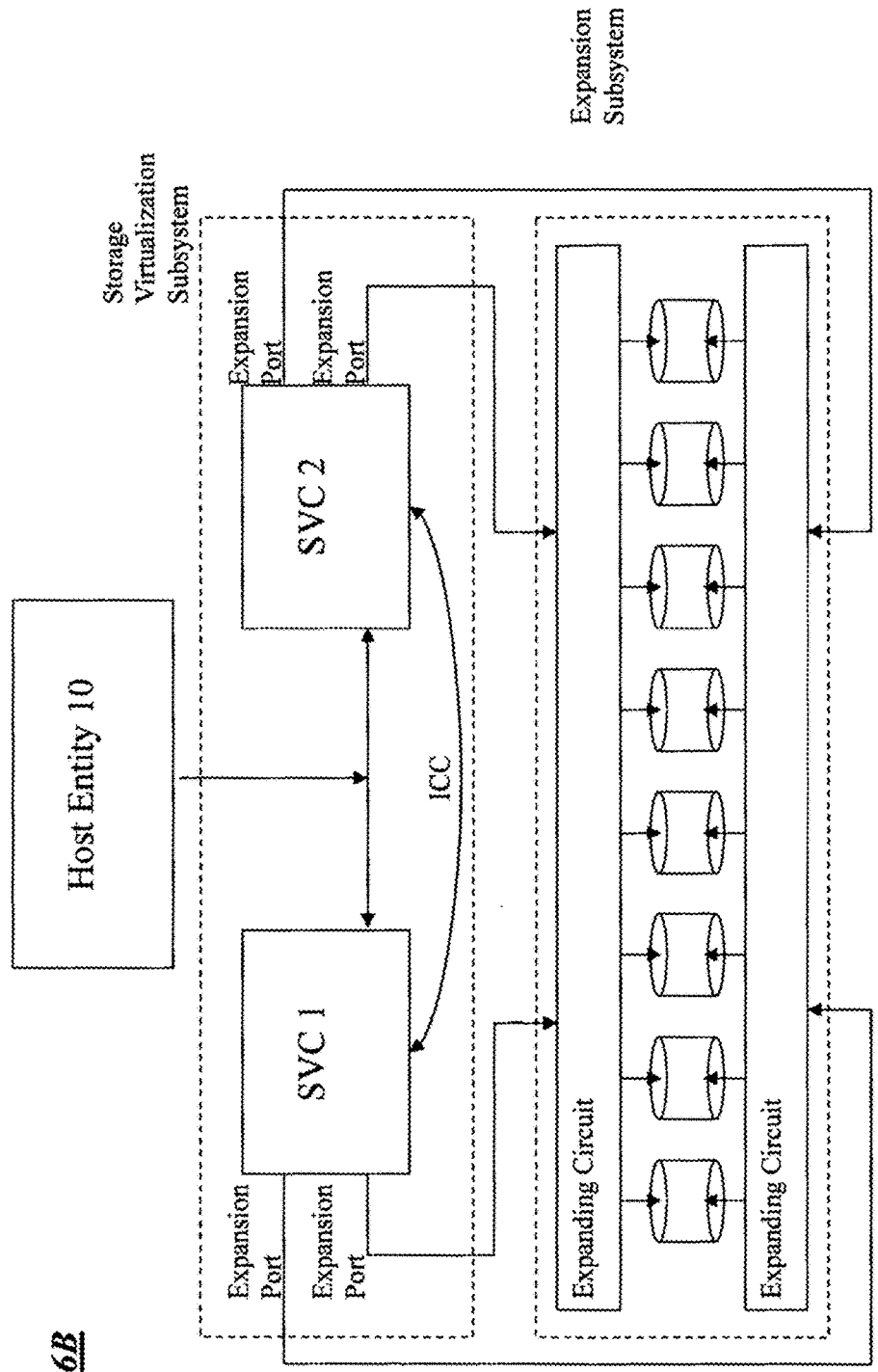
FIG. 16B and FIG. 16C are block diagrams of further implementations showing redundant SVC interconnected expansion ports.
Figure 16C:
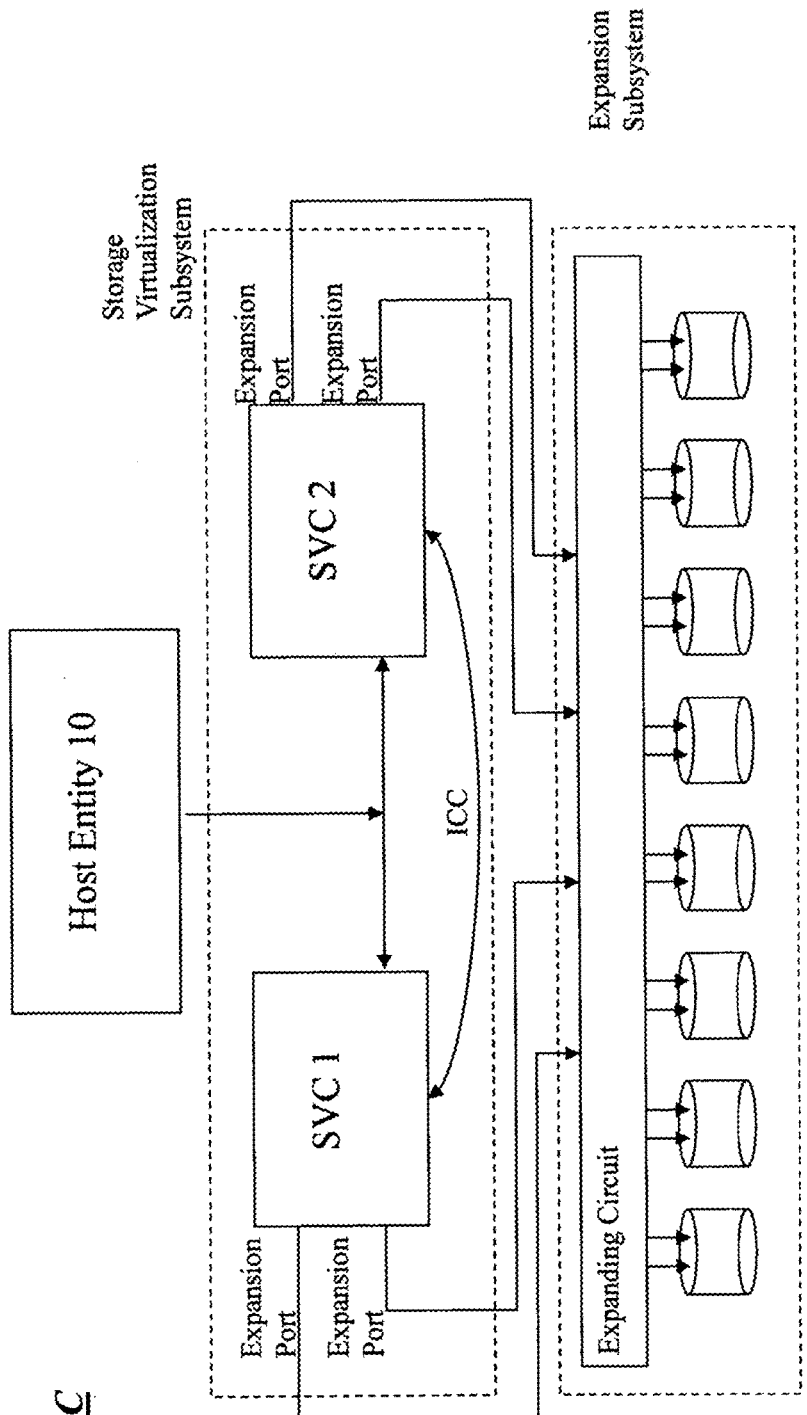

FIG. 16B and FIG. 16C show implementations similar to FIG. 16A but using of an expanding circuit instead of the connecting component. In the implementation shown in FIG. 16B, each redundant expansion port pair (the two expansion ports from different SVCs and connecting to the same connecting component) is provided with an expanding circuit. In the implementation shown in FIG. 16C, all redundant expansion ports are connected to a same expanding circuit.

Figure 17A:
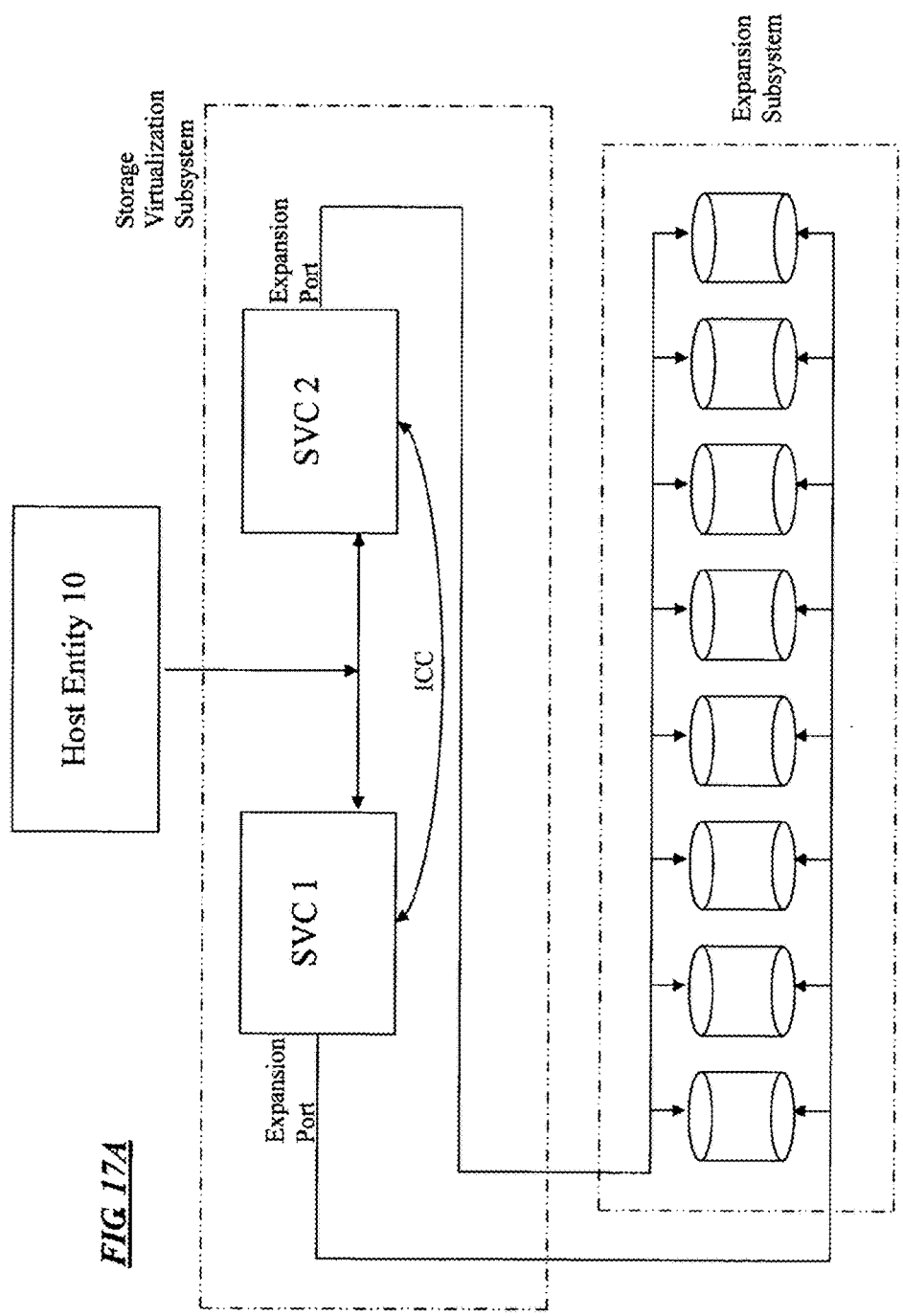
FIG. 17A is a block diagram of another redundant SVC interconnected expansion port implementation.

FIG. 17A depicts another possible implementation in which each expansion port on one SVC has a redundant complement on the other SVC. The expansion port on one SVC and its redundant complement on the other SVC are connected to the two ports of each dual-ported storage unit in such a way that one SVC's expansion port is connected to one port in the dual-ported pair and its complement on the other SVC to the other port. The complementary expansion ports are not interconnected but rather achieve redundancy by virtue of the dual-ported nature of each storage unit. However, dual-portedness of the storage units alone is not sufficient to support redundancy such that access by both SVCs can be maintained in the face of a malfunctioning expansion port on one of the SVCs or a malfunctioning interconnect connecting the expansion port on one of the SVCs to storage units. To achieve this, it is necessary to provide some mechanism for rerouting IO requests over to the interconnect that connects the alternate SVC to the storage units in the event that an SVC's own expansion port or the interconnect connecting it to the storage units malfunctions.

Figure 17B:
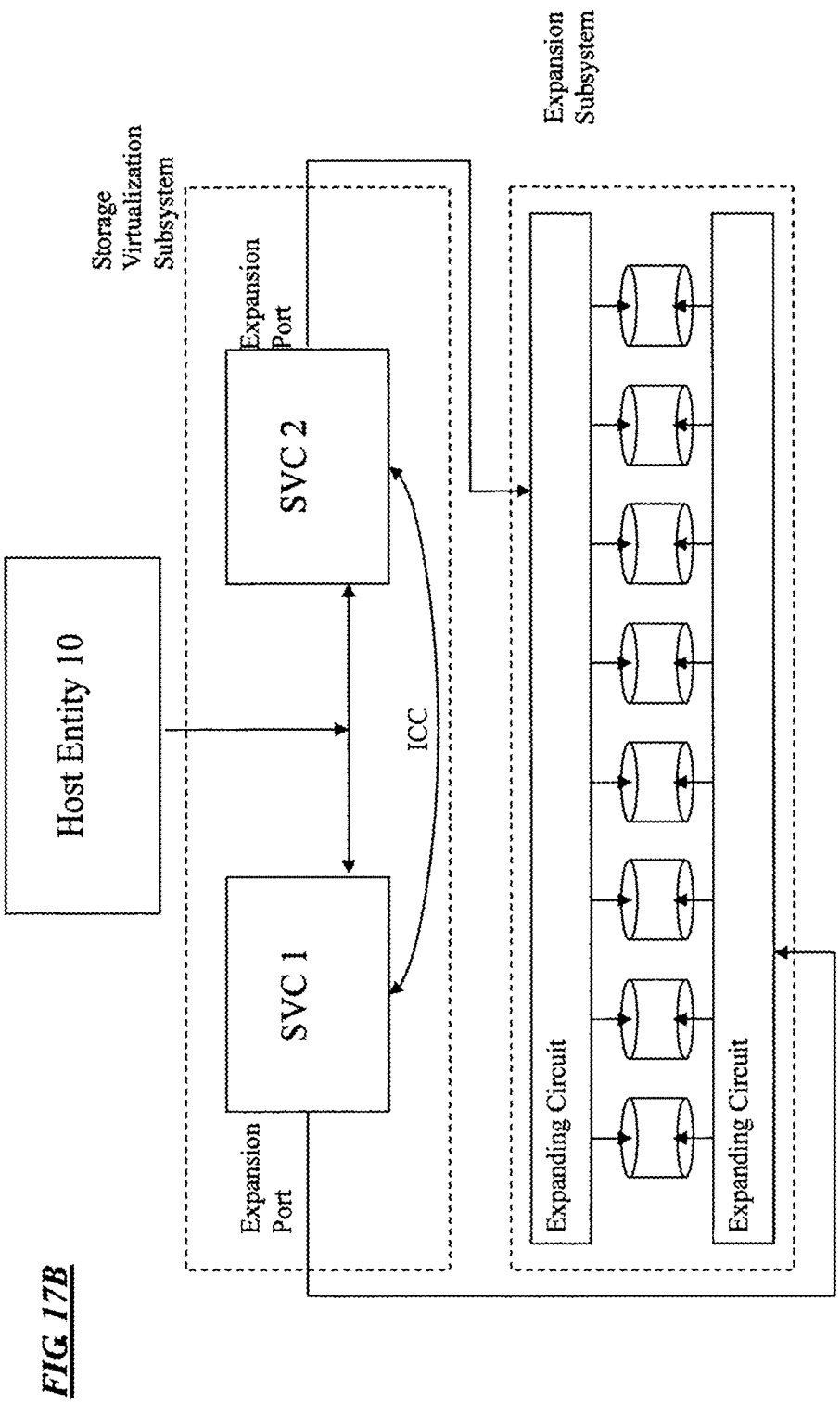
FIG. 17B is a block diagram of further an implementation showing redundant SVC interconnected expansion port.

FIG. 17B shows an implementation similar to FIG. 17A but particularly point out the using of an expanding circuit. In the implementation shown in FIG. 17B, each redundant expansion port is connected with an expanding circuit.

Yet another option for wiring of device expansion ports in the configuration depicted in FIGS. 17A and 17B is without any interconnection at all. In this case, redundancy can be achieved by rerouting IO requests from one SVC to the other and out the surviving complementary expansion-port/device-side-interconnect over the inter-SVC communication interconnect that is normally used for synchronizing the mutual states of the two SVCs with each other.

Figure 18:
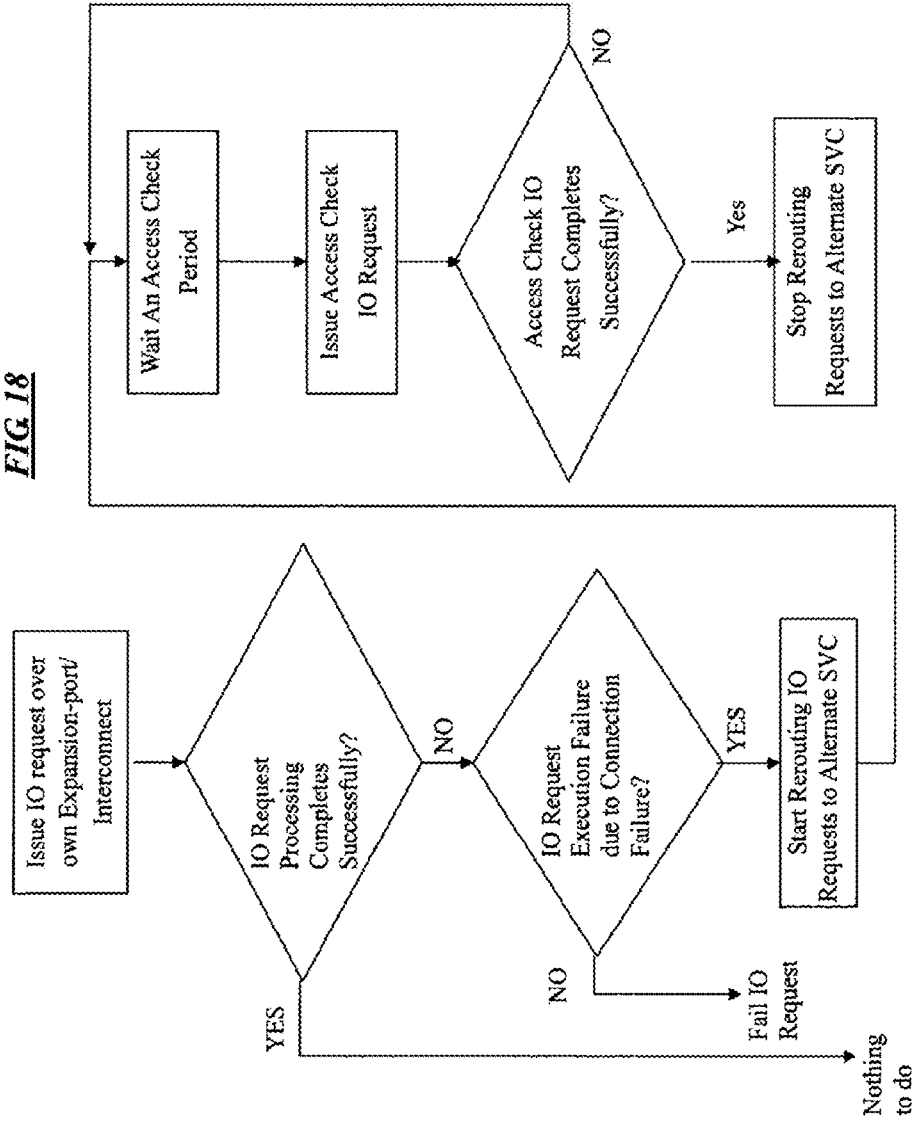
FIG. 18 is a flowchart of an IO request routing in a redundant SVC interconnected expansion port implementation.

When an SVC detects that a storage unit connected on an IO device interconnect that connects to one of its expansion ports can no longer be accessed, whether it is due to a detected break/malfunction in the expansion-port/interconnect or some other cause, the detecting SVC passes the IO request to the alternate SVC for the alternate SVC to issue to the same storage unit via the complementary expansion-port/interconnect and alternate storage unit port. Any data/status associated with the IO request is transferred between the two SVCs during the execution of the IO request. If the expansion-port/interconnect on the alternate SVC appears to be up and functioning normally yet access to the storage unit fails on the alternate SVC also, the storage unit would be considered as having failed or having been removed. If access succeeds, then the loss of access would be considered to be localized to the original SVC and IO requests associated with future accesses to the storage unit are automatically rerouted to the alternate SVC for issuance over the complementary expansion-port/interconnect. During this time, the original SVC monitors the accessibility of the storage unit via its expansion-port/interconnect typically by periodically issuing internally generated IO requests that check the state of the interconnect and storage unit. If, at some point, the original SVC discovers that the storage unit can now be accessed over its expansion-port/interconnect, it will stop rerouting IO requests to the alternate SVC and start issuing them directly over its own expansion-port/interconnect again. FIG. 18 shows a flowchart of this process.

Another feature that an SVC might typically implement is redundancy in the host-side interconnects in which multiple host-side interconnect ports are included on the SVC and LMUs are presented to the host identically over two or more of these interconnects. This feature is designed to allow the host the ability to maintain access to the LMU even if one of the interconnects and/or ports on the interconnect should break, become blocked, or otherwise malfunction.

For SAS DASD, the operation process is very similar by the process of SATA DASD case described above. The major difference is that both SVCs can connect to the SAS DASD directly by the dual SAS port of SAS DASD. Any one SVC which gets the ownership to access SAS DASD does not need access control switch 342. The SVC only needs to specify the correct SAS address connected to this SVC and perform the operations to the SAS DASD. According to an alternative embodiment of the present invention, however, the access ownership of the SVCs over a SAS DASD can also be implemented to be controlled through an access control switch for SAS DASD.

For the case that both SAS and SATA DASDs are connected to the SVCs, the SVC with the current access ownership has to identify the type of the target DASD for different access processes described above for SAS and SATA DASDs.

Figure 19:
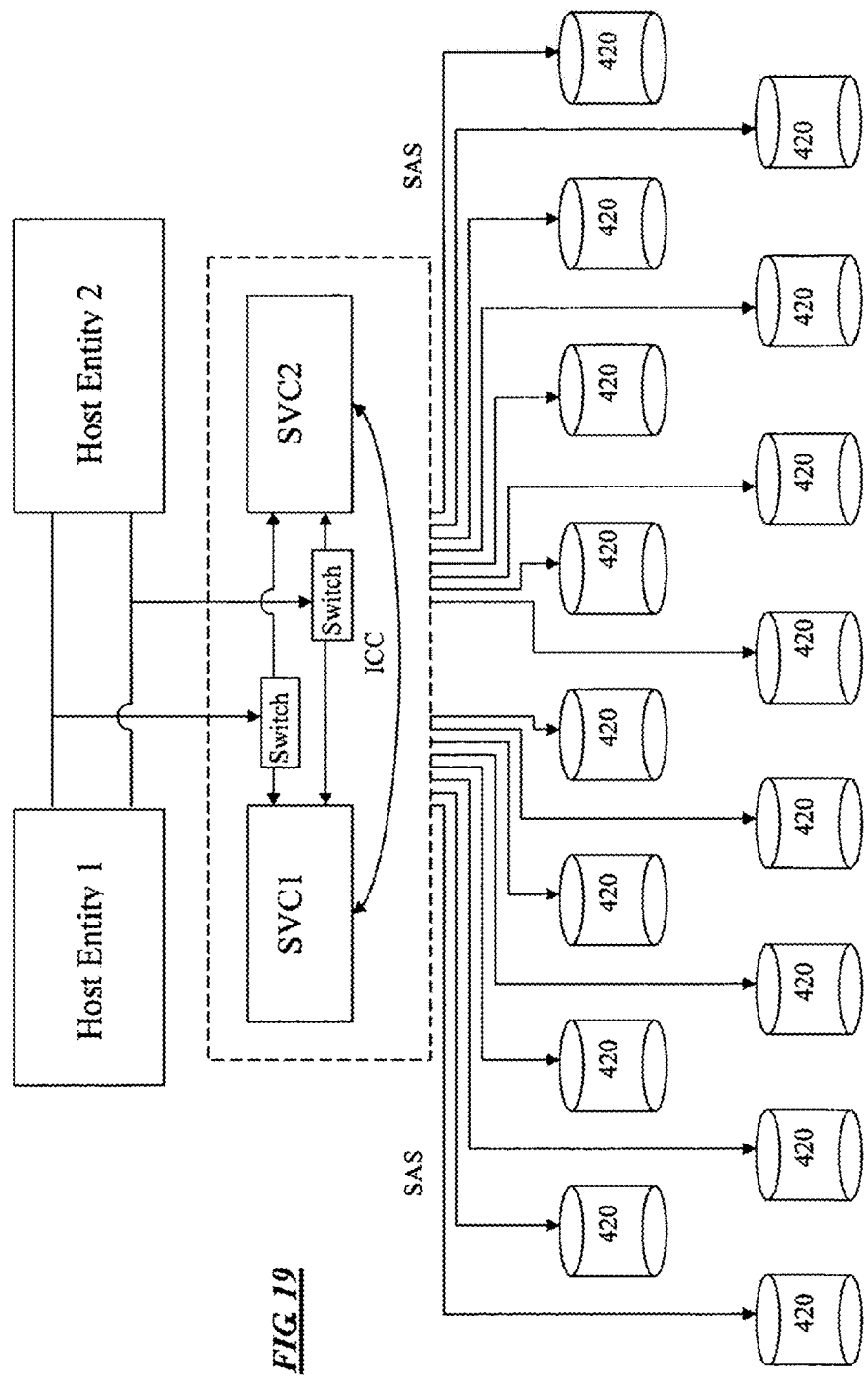
FIG. 19 is a block diagram of a redundant external storage virtualization computer system comprising two separate host-side ports on each SVC connecting to two entirely separate host-side IO device interconnects and host ports.

FIG. 19 depicts a redundant external storage virtualization computer system comprising two separate host-side ports on each SVC connecting to two entirely separate host-side IO device interconnects and host ports. Each port on one SVC has a complementary port on the alternate SVC to which it is interconnected. In a typical implementation supporting redundancy in the host-side interconnects, each SVC would present the same set of logical media units in an identical fashion on both of its ports.

Under normal operation, host (s) can access logical media units through an SVC that is configured to present the LMU over a host-side interconnect. This can be one SVC or both of the SVCs in the redundant pair. If one SVC were to malfunction, logical media units that were already being presented to the host(s) by both SVCs would remain accessible through the normally-functioning SVC and, with the help of special purpose "multiple-redundant-pathing" functionality on the host, on detection that IO request processing through one of the SVCs is disrupted, the IO requests would be completely routed to the normally-functioning SVC.

Those LMUs that were originally only being presented to the host by the SVC that is now malfunctioning would immediately be presented to the host(s) by the normally-functioning SVC over host-side interconnects that connect it to the hosts. For these LMUs, the normally-functioning SVC would be able to transparently take over the processing of host IO requests simply by presenting itself on each interconnect, together with all the reassigned logical media units, in an identical way to what the malfunctioning SVC did prior to its malfunctioning. With this kind of "transparent takeover", the host need not implement special functionality to make it aware of the SVC malfunctioning and reroute IOs itself in response.

In addition to SVC redundancy, the two sets of complementary ports in turn form a redundant port complement. A host that has two independent ports connected using two separate IO device interconnects to these two complementary redundant port sets then has two independent paths to each logical media unit over which it can issue IO requests. Should one of the ports on the host or on an SVC malfunction or should the IO device interconnect itself break or become blocked, the hosts implementing multiple-redundant-pathing functionality can reroute IO requests over the other redundant path. Alternately, when both paths are functioning normally, the host can elect to issue IO requests over both paths in an effort to balance the load between the paths, a technique referred to as "load balancing".

Figure 20:
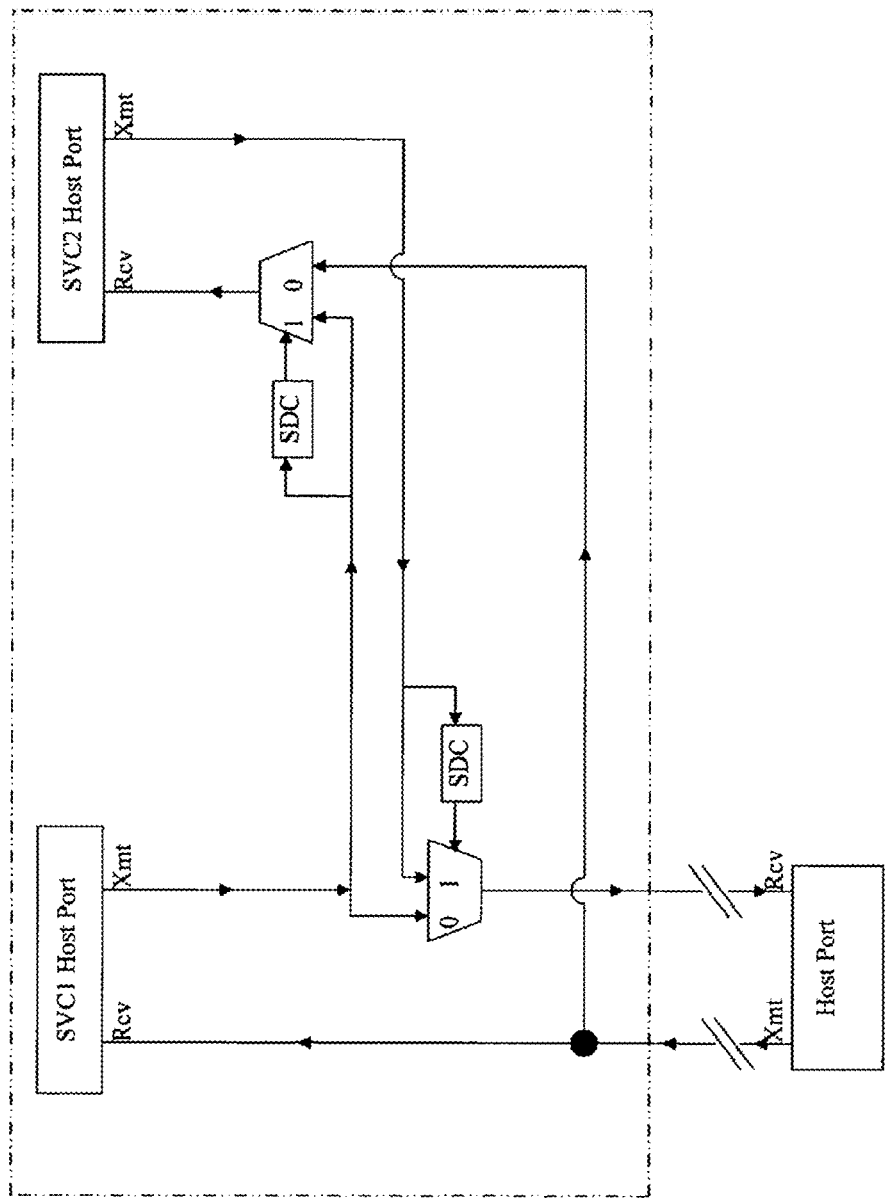
FIG. 20 is a block diagram showing an example of a switch circuit that can be used to accomplish the host side interconnection of FIG. 19.

To achieve the transparent takeover functionality described above, each of the pair of ports, one on each SVC, that form a complementary port pair are physically interconnected. For bus-style multiple-device IO device interconnects such as Parallel SCSI, the interconnection simply consists of wiring the devices together directly without any intervening circuitry. For other types of interconnects, special switch circuitry may be required to achieve the physical interconnection required. FIG. 20 shows an example of a switch circuit that can be used to accomplish this interconnection for Fibre/SAS interconnects in which hardware signal detection (SDC) is used to activate the switch state changes.

Figure 21:
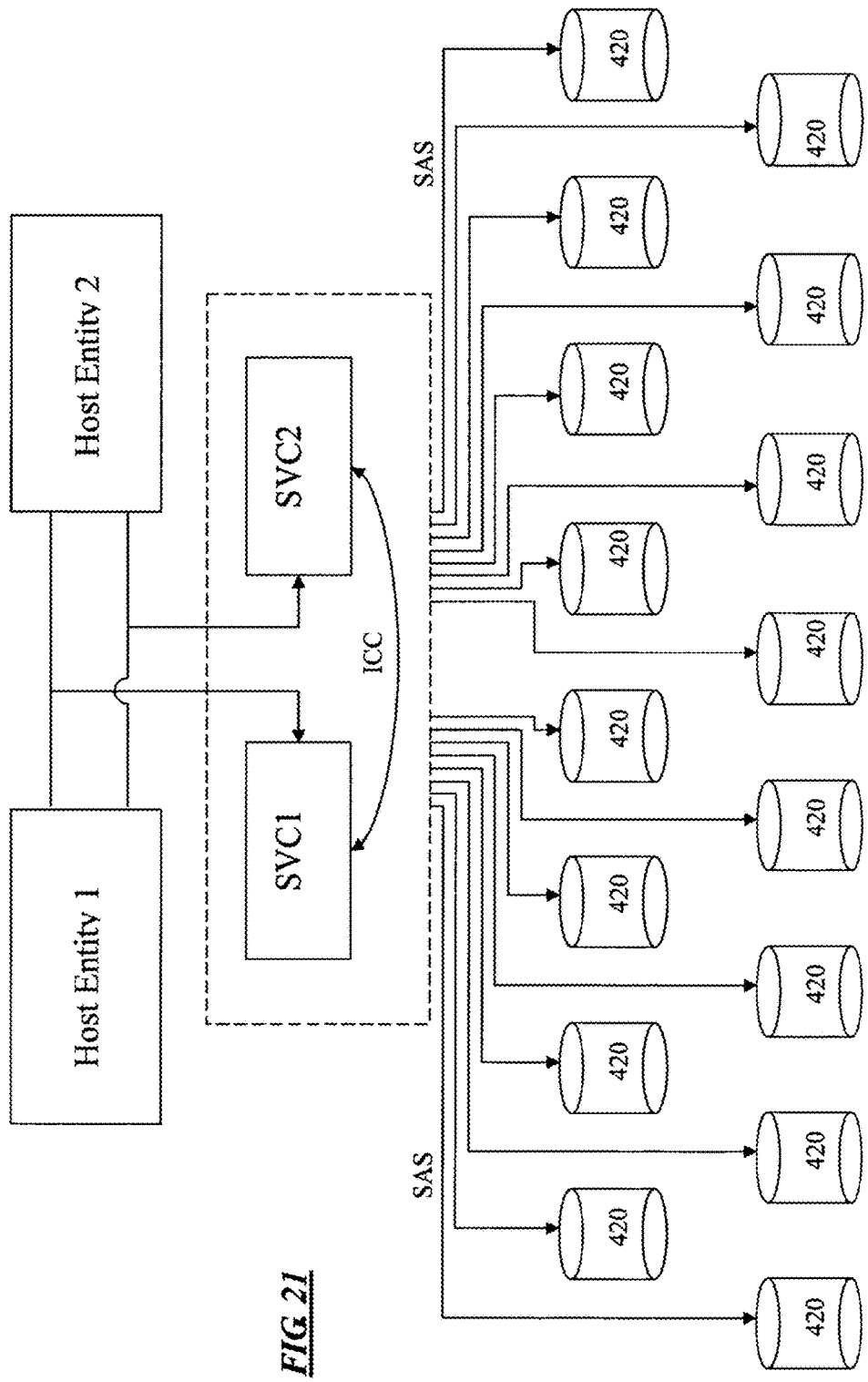
FIG. 21 is a block diagram of a redundant external storage virtualization computer system comprising one host-side port on each SVC connecting to one host-side IO device interconnect and host ports.
Figure 22:
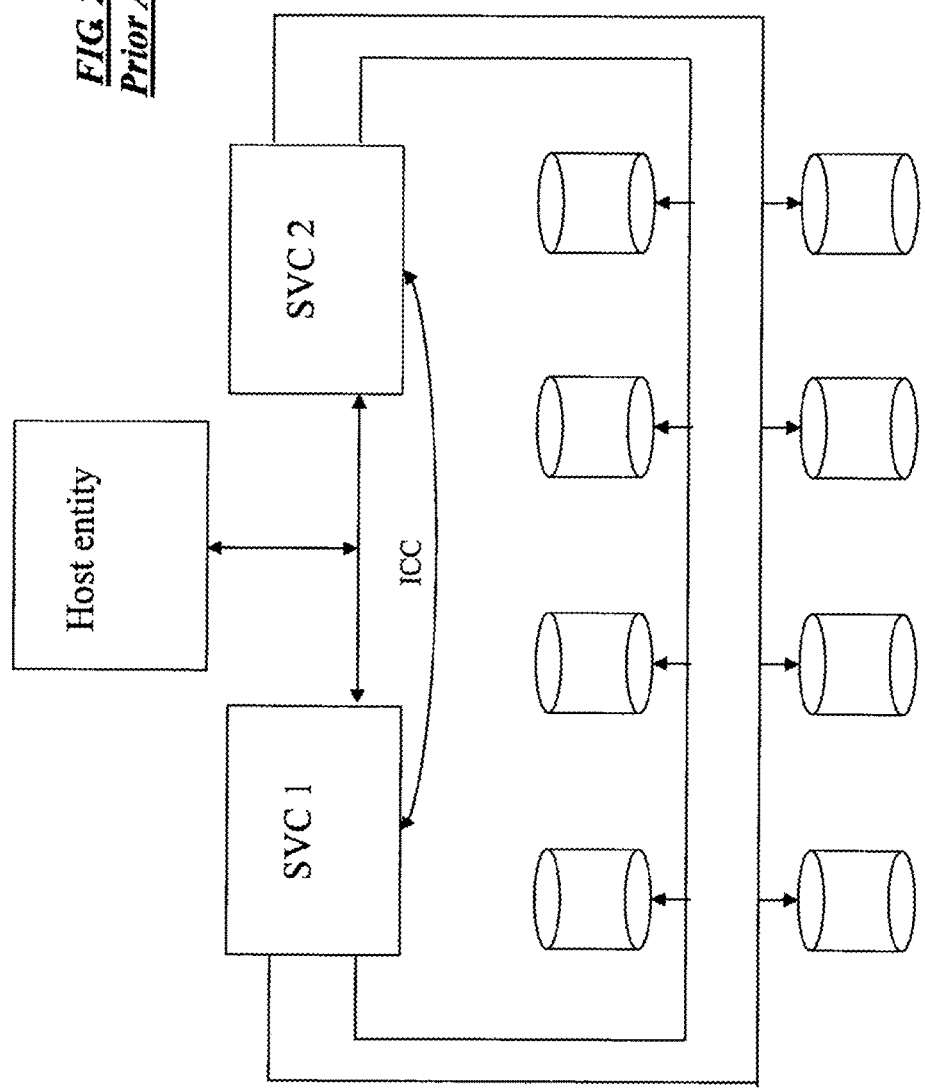
FIG. 22 is a block diagram of a conventional redundant external storage virtualization computer system.
Figure 23:
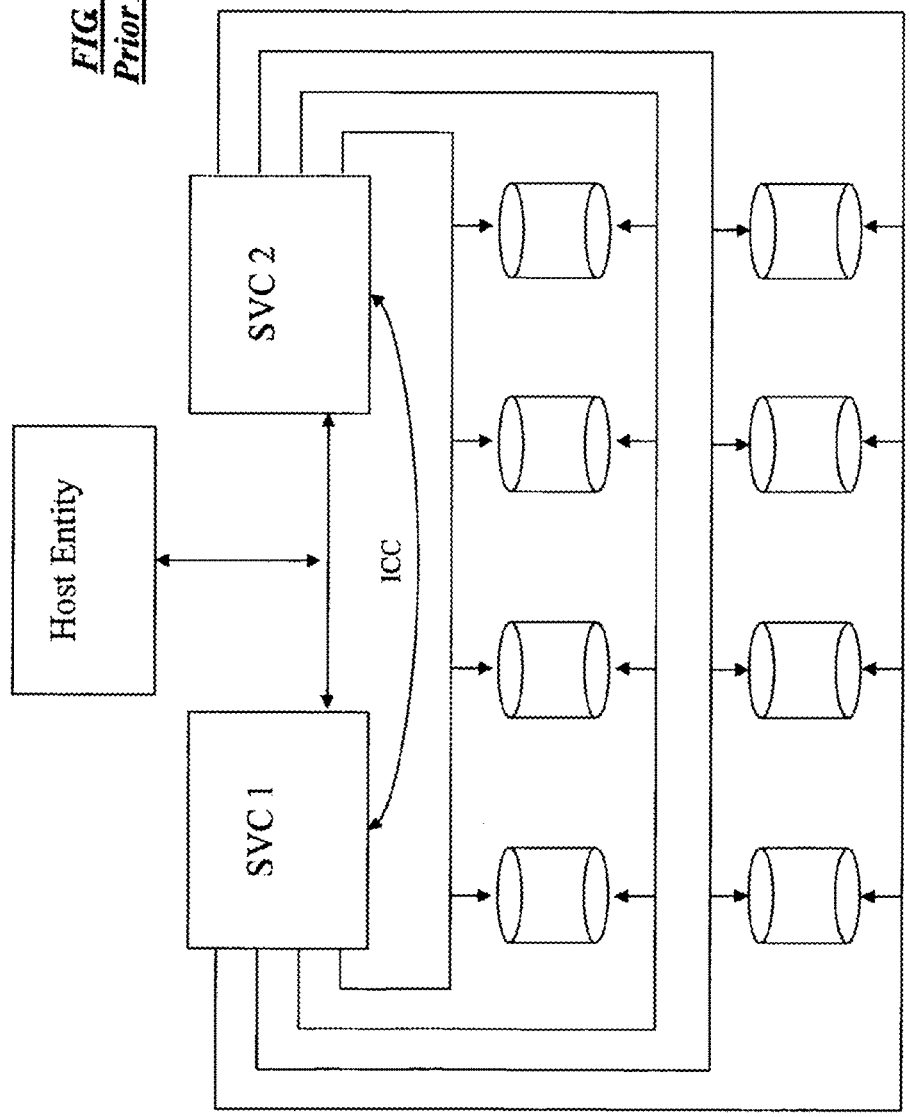
FIG. 23 is a block diagram of another conventional redundant external storage virtualization computer system.

In configurations in which the hosts implement multiple-redundant-pathing functionality, there is an alternate host-side interconnect configuration that requires fewer interconnects to achieve similar levels of redundancy as shown in FIG. 21. Note that host-side interconnects connecting an SVC to the hosts are not interconnected to the alternate SVC. In this configuration, interconnect redundancy is achieved by making each LMU accessible to the hosts over a host-side interconnect of one SVC also accessible through an alternate host-side interconnect on the alternate SVC. Should one of the interconnects break, become blocked, or otherwise malfunction, the hosts would still be able to access the LMU through the alternate SVC via the alternate interconnect. Similarly, should one of the SVCs malfunction, the other SVC can take over and, once again, the hosts would still be able to access the LMU through the normally-functioning SVC via the alternate interconnect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A redundant storage virtualization subsystem (SVS) for providing data storage space, comprising:
 a redundant external storage virtualization controller (SVC) pair which are for performing IO operations in response to IO requests from a host entity, and comprise a first external SVC and a second external SVC both for coupling to the host entity; and
 a group of physical storage devices (PSDs) for providing data storage space to the host entity, in which at least one member of said group of PSDs is coupled to the said redundant external SVC pair through a serial signal interconnect for transmission with serial attached small computer system interface-(SAS) protocol, in which each of the PSDs is a hard disk drive (HDD) or a solid state drive (SSD);
 wherein in the redundant external SVC pair, each of the external SVCs further comprises:

a central processing circuitry for performing the IO operations in response to the IO requests;
 at least one IO device interconnect controller coupled to said central processing circuitry;
 at least one host-side IO device interconnect port provided in one of said at least one IO device interconnect controller for coupling to said host entity; and
 at least one SAS device-side IO device interconnect port provided in one of said at least one IO device interconnect controller coupled to said PSDs through said serial-signal interconnect;
 wherein when one SVC in said redundant external SVC pair is not on line or goes off line after being on line, the alternate SVC in said redundant external SVC pair will automatically take over the functionality originally performed by said one SVC in the redundant external SVC pair;
 wherein an inter-controller communication channel (ICC) is provided between the two SVCs in said redundant external SVC pair for communicating state synchronization information;
 wherein said inter-controller communication channel is to exchange parameters and data relating to operation of the redundant storage virtualization subsystem;
 wherein said first external SVC and said second external SVC are configured to define at least one virtualized logical media unit (LMU) consisting of sections of said group of PSDs, and are configured to provide a mapping that maps combination of the sections of said group of PSDs to the at least one virtualized LMU visible to the host entity, and the at least one virtualized LMU is contiguously addressable by the host entity to which the at least one virtualized LMU is made available;
 wherein the IO requests are parsed to determine what operation is to be performed and on which sections of the virtualized LMU the operation is to be performed;
 wherein when the operation comprises internally-emulated, asynchronous device sub-operations, then the SVC executes the associated sub-operations including transferring any associated data to/from the host entity, and wherein when there is a failed operation, the SVC responds to the host entity with a status report indicating that the operation failed;
 wherein when one of the SVC pair detects a malfunction of the other SVC, the one SVC monitors a state of the SVS to determine whether to send a signal to the malfunctioning SVC; and
 wherein said redundant external SVC pair are alive and perform an IO request rerouting function such that when one of said redundant external SVC pair, both of which are alive, receives one of the I/O requests accessing the at least one virtualized LMU, then the I/O request is dispatched through the one SVC or the other SVC to access the at least one virtualized LMU.

2. The redundant SVS of claim 1, further comprising providing an access ownership transferring mechanism for said SVC and the alternate SVC in the said redundant external SVC pair to cooperatively transfer access ownership back and forth therebetween; and wherein the SVC is configured to perform the access ownership transferring mechanism such that when the storage virtualization controller receives the I/O requests accessing the at least one LMU and has no access ownership of the at least one LMU, the SVC is configured to get the access ownership from the alternate SVC which has the access ownership of the at least one LMU, and then the SVC is configured to process the IO requests to access the at least one LMU.

3. The redundant SVS of claim 1, further comprising an enclosure management services mechanism for managing and monitoring a device belonging to an enclosure of the SVS, and the device excludes said group of PSDs.

4. The redundant SVS of claim 1, wherein said group of PSDs are received in a plurality of enclosures.

5. The redundant SVS of claim 1, wherein when the operation comprises a synchronous device sub-operation, a device-side IO request is generated and issued to appropriate PSDs in response.

6. The redundant SVS of claim 1, wherein when a write IO request of the IO requests from the host entity is received by the SVC, a write IO request complete report is first issued to the host entity by the SVC before data of the write IO request is actually committed into the PSDs.

7. The redundant SVS of claim 1, wherein said redundant external SVC pair are alive and perform an IO request rerouting function such that when one of said redundant external SVC pair, both of which are alive, receives the I/O requests accessing the at least one virtualized LMU and is determined not to have an access ownership that allows to access the at least one virtualized LMU, the one SVC will pass the IO requests, via the inter-controller communication interconnect (ICC), to the other of said redundant external SVC pair, which is determined to have the access ownership that allows to access the at least one virtualized LMU, and the other SVC will process the IO requests to access the at least one virtualized LMU and send an I/O request execution completion status information to the receiving SVC.

8. The redundant SVS of claim 1, wherein for each of said PSDs, the redundant SVS further comprises an access control switch coupled between each of said PSDs and the redundant external SVC pair for selectively switching the connection of each of said PSDs to the redundant external SVC pair between the first external SVC and the second external SVC.

9. The redundant SVS of claim 8, wherein said access control switch coupled between one of said PSDs and the redundant external SVC pair selectively allows patching through of the serial signal of said one PSD to and from the first external SVC when in a first patching state of said access control switch and to and from the second external SVC when in a second patching state of said access control switch.

10. The redundant SVS of claim 1, wherein one of said host-side IO device interconnect port and one of said SAS device-side IO device interconnect port are provided in a same said IO device interconnect controller.

11. The redundant SVS of claim 1, wherein said at least one IO device interconnect controller comprises a plurality of IO device interconnect controllers; wherein one of said host-side IO device interconnect port and one of said SAS device-side IO device interconnect port are provided in different said IO device interconnect controllers.

12. The redundant SVS of claim 1, wherein a logical media unit that is presented to said host entity through a first said host-side IO device interconnect port is also redundantly presented to said host entity through a second said host-side IO device interconnect port in order to make the host entity maintain access to the PSD even if one of the interconnects breaks, becomes blocked or malfunctions.

13. The redundant SVS of claim 12, wherein the first said host-side IO device interconnect port and the second said host-side IO device interconnect port are IO device interconnect ports of the same one SVC in the redundant external SVC pair.

14. The redundant SVS of claim 12, wherein the first said host-side IO device interconnect port is an IO device interconnect port of one SVC in the redundant external SVC pair and the second said host-side IO device interconnect port is an IO device interconnect port of the other SVC in the redundant external SVC pair.

15. The redundant SVS of claim 12, wherein the first said host-side IO device interconnect port and the second said host-side IO device interconnect port are coupled to the same host-side IO device interconnect.

16. The redundant SVS of claim 15, wherein the first said host-side IO device interconnect port and the second said host-side IO device interconnect port are coupled to the said same host-side IO device interconnect through a switch circuit.

17. The redundant SVS of claim 12, wherein the first said host-side IO device interconnect port and the second said host-side IO device interconnect port are each coupled to a different host-side IO device interconnect.

18. The redundant SVS of claim 1, wherein said host-side IO device interconnect port comprises one of the following types: Fibre Channel supporting point-to-point connectivity in target mode, Fibre Channel supporting public loop connectivity in target mode, Fibre Channel supporting private loop connectivity in target mode, parallel SCSI (Small Computer System Interface) operating in target mode, ethernet supporting the iSCSI (Internet Small Computer System Interface) protocol operating in target mode, SAS (Serial Attached Small Computer System Interface) operating in target mode, Serial ATA (Serial Advanced Technology Attachment) operating in target mode, IEEE 1394A/IEEE 1394B, and, USB/USB (Universal Serial Bus) 2.0.

19. The redundant SVS of claim 1, wherein said inter-controller communication channel is an existing IO device interconnect, whereby inter-controller communication exchange is multiplexed with IO requests and associated data.

20. The redundant SVS of claim 1, wherein said inter-controller communication channel is a dedicated channel the primary function thereof is to exchange said state synchronization information.

21. The redundant SVS of claim 1, wherein said inter-controller communication channel comprises one of the following types Fibre Channel, Serial ATA (Serial Advanced Technology Attachment), Parallel SCSI (Serial Advanced Technology Attachment), Ethernet, SAS (Serial Attached SCSI), I2C (Inter-Integrated Circuit), and, PCI-Express (Peripheral Component Interconnect Express).

22. The redundant SVS of claim 1, wherein said group of PSDs include a first set of PSDs and a second set of PSDs, and said first set of PSDs and said second set of PSDs are not received in a same enclosure, and at least one member SVC of said redundant external SVC pair includes at least one expansion port for coupling to said second set of PSDs in a second enclosure through at least one external cable.

23. The redundant SVS of claim 22, wherein members of a set of at least one said expansion port are mutually coupled together and to said second set of PSDs through a switch circuit.

24. The redundant SVS of claim 22, wherein a set of at least two said expansion ports form a redundant expansion port set for mutually performing IO request rerouting function whereby IO requests normally delivered to said second set of PSDs through a first member port of said redundant expansion port set may be rerouted through a second member port of said redundant expansion port set.

25. The redundant SVS of claim 22, wherein a member of said second set of PSDs has a pair of redundant ports with a member port of said redundant port pair being coupled to a set of at least one said expansion port.

26. The redundant SVS of claim 25, wherein the IO request rerouting function is performed through said redundant ports of said member of said second set of PSDs whereby IO requests normally delivered to said second set of PSDs through a first member port of said redundant port pair may be rerouted to said second set of PSDs through a second member port of said redundant port pair.

27. The redundant SVS of claim 26, wherein a set of at least two said expansion ports form a redundant expansion port set for mutually performing IO request rerouting function whereby IO requests normally delivered to said second set of PSDs through a first member port of said redundant expansion port set may be rerouted through a second member port of said redundant expansion port set.

28. The redundant SVS of claim 25, wherein each member port in said PSD redundant port pair is coupled to a different set of at least one expansion port.

29. The redundant SVS of claim 25, wherein said member port of redundant PSD port pair and said set of at least one said expansion port are mutually coupled together through a switch circuit.

30. The redundant SVS of claim 29, wherein said set of at least one expansion port comprises a first and a second expansion port subset forming a pair of complementary subsets with at least one member expansion port per subset.

31. The redundant SVS of claim 30, wherein one of the interconnect signal line switching mechanisms implemented by said switch circuit is the coupling of said first subset of the said complementary subset pair to a first member port of said PSD redundant port pair and coupling of said second subset of the said complementary subset pair to a second member port of said PSD redundant port pair.

32. The redundant SVS of claim 31, wherein one of the interconnect signal line switching mechanisms implemented by said switch circuit is the coupling of both subsets of the said complementary subset pair to a first member port of said PSD redundant port pair.

33. The redundant SVS of claim 31, wherein one of the interconnect signal line switching mechanisms implemented by said switch circuit is the coupling of said first subset of the said complementary subset pair to a first member port of said PSD redundant port pair.

34. The redundant SVS of claim 25, wherein a member SVC of the redundant external SVC pair further comprises at least two said expansion ports forming a redundant expansion port set.

35. The redundant SVS of claim 34, wherein a first and a second member port in the said redundant expansion port set are each coupled to a different one of member ports in redundant PSD port pair of a member PSD of said second set of PSDs.

36. The redundant SVS of claim 34, wherein a first and a second member port in the said redundant expansion port set are both coupled to the same one of member ports in redundant PSD port pair of a member PSD of said second set of PSDs.

37. The redundant SVS of claim 25 comprising: a first expansion port set comprising at least one said expansion port on the first external SVC in the redundant external SVC pair; a second expansion port set comprising at least one said expansion port on the second external SVC in the redundant external SVC pair; wherein said first expansion port set and said second expansion port set together form a redundant expansion port set pair.

38. The redundant SVS of claim 37, wherein said first expansion port set and said second expansion port set are each coupled to a different one of member ports in redundant PSD port pair of each PSD of said second set of PSDs.

39. The redundant SVS of claim 37, wherein said first expansion port set and said second expansion port set are both coupled to the same one of member ports in redundant PSD port pair of each PSD of said second set of PSDs.

40. The redundant SVS of claim 22, wherein at least one said expansion port is Fibre Channel, Serial ATA, Parallel SCSI, Ethernet, SAS, IEEE1394A/IEEE1394B, and, USB/USB2.0.

41. The redundant SVS of claim 1, wherein said group of PSDs comprise one of the following PSD types: a SAS (Serial Attached SCSI) PSD, a SATA (Serial Advanced Technology Attachment) PSD, and a PATA (Parallel Advanced Technology Attachment) PSD.

42. The redundant SVS of claim 1, wherein each SVC in said redundant external SVC pair includes a state-defining circuit for forcing externally connected signal lines of alternate SVC in said redundant external SVC pair to a predetermined state.

43. The redundant SVS of claim 1, wherein each SVC of said redundant external SVC pair includes a self-killing circuit for forcing its own externally connected signal lines to a predetermined state.

44. An external storage virtualization controller (SVC) for using in a redundant external SVC pair of a redundant storage virtualization subsystem (SVS), said external storage virtualization controller comprising:
   a central processing circuitry for performing IO operations in response to IO requests from a host entity;
   at least one IO device interconnect controller coupled to said central processing circuitry;
   at least one host-side IO device interconnect port provided in one of said at least one IO device interconnect controller for coupling to said host entity; and
   at least one serial attached small computer system interface (SAS) device-side IO device interconnect port provided in one of said at least one IO device interconnect controller for performing serial signal transmission with SAS protocol with a group of PSDs, in which each of the PSDs is a hard disk drive (HDD) or a solid state drive (SSD);
   wherein the said external SVC will automatically take over the functionality originally performed by the alternate external SVC in the said redundant external SVC pair when said alternate external SVC is not on line or goes off line after being on line; wherein an inter-controller communication channel is provided between the two SVCs in said redundant external SVC pair for communicating state synchronization information;
   wherein said inter-controller communication channel is to exchange parameters and data relating to operation of a redundant storage virtualization subsystem;
   wherein said two SVCs are configured to define at least one virtualized logical media unit (LMU) consisting of sections of said group of PSDs, and are configured to provide a mapping that maps combination of the sections of said group of PSDs to the at least one virtualized LMU visible to the host entity, and the at least one virtualized LMU is contiguously addressable by the host entity to which the at least one virtualized LMU is made available; and wherein the IO requests are parsed to determine what operation is to be performed and on which sections of the virtualized LMU the operation is to be performed;

wherein when the operation comprises internally-emulated, asynchronous device sub-operations, then the SVC executes the associated sub-operations including transferring any associated data to/from the host entity, and wherein when there is a failed operation, the SVC responds to the host entity with a status report indicating that the operation failed;

wherein when one of the SVC pair detects a malfunction of the other SVC, the one SVC monitors a state of the SVS to determine whether to send a signal to the malfunctioning SVC; and wherein said redundant external SVC pair are alive and perform an IO request rerouting function such that when one of said redundant external SVC pair, both of which are alive, receives one of the I/O requests accessing the at least one virtualized LMU, then the I/O request is dispatched through the one SVC or the other SVC to access the at least one virtualized LMU.

45. The SVC of claim 44 further comprising a detection mechanism for detecting an off-line or failed state of said alternate SVC.

46. The SVC of claim 44, wherein said SVC includes a state-defining circuit for forcing externally connected signal lines of alternate SVC in said redundant external SVC pair to a predetermined state.

47. The SVC of claim 44, wherein said SVC includes a self-killing circuit for forcing its own externally connected signal lines to a predetermined state.

48. The SVC of claim 44, wherein an inter-controller communication port is provided for communicating state synchronization information between the said SVC and the alternate SVC in said redundant external SVC pair.

49. The SVC of claim 48, wherein said inter-controller communication port comprises one of the following types: Fibre Channel, Serial ATA (Serial Advanced Technology Attachment), Parallel SCSI (Small Computer System Interface), Ethernet, SAS (Serial Attached Small Computer System Interface), I2C, and PCI-Express (Peripheral Component Interconnect Express).

50. A method for performing storage virtualization in a computer system having a first and a second external storage virtualization controller (SVC) configured into a redundant external SVC pair, where each of said first and second external SVC comprises: a central processing circuitry for performing IO operations in response to IO requests from a host entity; at least one IO device interconnect controller coupled to said central processing circuitry(CPC); at least one host-side IO device interconnect port provided in one of said at least one IO device interconnect controller for coupling to said host entity; and at least one serial attached small computer system interface (SAS) device-side IO device interconnect port provided in one of said at least one IO device interconnect controller for performing serial-signal transmission with SAS protocol with a group of PSDs, the method comprising:

in response to the IO requests from the host entity of the computer system, performing the IO operations, by said CPC of one SVC in said redundant external SVC pair, to access said group of PSDs of the computer system using serial signal transmission with SAS protocol, in which each of the PSDs is a hard disk drive (HDD) or a solid state drive (SSD);

when said one SVC in said redundant external SVC pair is not on line or goes off line after being on line, performing, by said CPC of the alternate SVC in said redundant external SVC pair, the said IO operations in response to said IO requests issued by said host entity to access said group of PSDs of the computer system;

wherein an inter-controller communication channel is provided between the two SVCs in said redundant external SVC pair for communicating state synchronization information;

wherein said inter-controller communication channel is to exchange parameters and data relating to operation of a redundant storage virtualization subsystem;

wherein said first and second external SVC are configured to define at least one virtualized logical media unit (LMU) consisting of sections of said group of PSDs, and are configured to provide a mapping that maps combination of the sections of said group of PSDs to the at least one virtualized LMU visible to the host entity, and the at least one virtualized LMU is contiguously addressable by the host entity to which the at least one virtualized LMU is made available; and wherein the IO requests are parsed to determine what operation is to be performed and on which sections of the virtualized LMU the operation is to be performed;

wherein when the operation comprises internally-emulated, asynchronous device sub-operations, then the SVC executes the associated sub-operations including transferring any associated data to/from the host entity, and wherein when there is a failed operation, the SVC responds to the host entity with a status report indicating that the operation failed;

wherein when one of the SVC pair detects a malfunction of the other SVC, the one SVC monitors a state of the computer system to determine whether to send a signal to the malfunctioning SVC;

wherein said alternate SVC will automatically take over the functionality originally performed by said one of the SVCs when said one SVC is not on line or goes off line after being on line; and wherein said redundant external SVC pair are alive and perform an IO request rerouting function such that when one of said redundant external SVC pair, both of which are alive, receives one of the I/O requests accessing the at least one virtualized LMU, then the I/O request is dispatched through the one SVC or the other SVC to access the at least one virtualized LMU.

* * * * *